(12) United States Patent
Watano et al.

(10) Patent No.: US 11,248,767 B2
(45) Date of Patent: Feb. 15, 2022

(54) SENSOR SYSTEM, SENSOR MODULE, AND LAMP DEVICE

(71) Applicant: KOITO MANUFACTURING CO., LTD., Tokyo (JP)

(72) Inventors: Yuichi Watano, Shizuoka (JP); Yukio Nomura, Shizuoka (JP); Yoshiyuki Nakanishi, Shizuoka (JP); Teppei Muramatsu, Shizuoka (JP); Yichao Xie, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/978,556

(22) PCT Filed: Mar. 1, 2019

(86) PCT No.: PCT/JP2019/008085
§ 371 (c)(1),
(2) Date: Sep. 4, 2020

(87) PCT Pub. No.: WO2019/172118
PCT Pub. Date: Sep. 12, 2019

(65) Prior Publication Data
US 2021/0025560 A1    Jan. 28, 2021

(30) Foreign Application Priority Data

Mar. 5, 2018  (JP) .............................. JP2018-038876
Mar. 16, 2018 (JP) .............................. JP2018-049743
(Continued)

(51) Int. Cl.
*F21S 41/657*  (2018.01)
*B60Q 1/068*  (2006.01)
(Continued)

(52) U.S. Cl.
CPC ............ *F21S 41/657* (2018.01); *B60Q 1/068* (2013.01); *G01S 7/4813* (2013.01); *G01S 17/931* (2020.01)

(58) Field of Classification Search
CPC ............................ G01S 17/931; G01S 7/4813
See application file for complete search history.

(56) References Cited

U.S. PATENT DOCUMENTS

| | | | |
|---|---|---|---|
| 5,313,213 A | 5/1994 | Neumann et al. | |
| 7,579,593 B2* | 8/2009 | Onozawa | G01S 7/493 250/332 |

(Continued)

FOREIGN PATENT DOCUMENTS

| | | |
|---|---|---|
| JP | H404040404 U | 4/1992 |
| JP | H08114446 A | 5/1996 |

(Continued)

OTHER PUBLICATIONS

International Search Report issued in International Application No. PCT/JP2019/008085, dated May 28, 2019 (5 pages).
(Continued)

*Primary Examiner* — Robert J May
(74) *Attorney, Agent, or Firm* — Osha Bergman Watanabe & Burton LLP

(57) ABSTRACT

A first camera unit (111) acquires an image including at least an area ahead of a vehicle based on a first optical axis (X1). A second camera unit (112) acquires an image including at least an area on the left of the vehicle based on a second optical axis (X2). When viewed from an up-down direction of the vehicle, the first optical axis (X1) and the second optical axis (X2) intersect with each other.

17 Claims, 26 Drawing Sheets

(30) Foreign Application Priority Data

Apr. 10, 2018 (JP) .............................. JP2018-075300
Apr. 20, 2018 (JP) .............................. JP2018-081311

(51) Int. Cl.
*G01S 7/481* (2006.01)
*G01S 17/931* (2020.01)

(56) References Cited

U.S. PATENT DOCUMENTS

| | | |
|---|---|---|
| 2001/0024171 A1 | 9/2001 | Nishimura |
| 2013/0026350 A1 | 1/2013 | Yao et al. |
| 2014/0247349 A1 | 9/2014 | Heard |
| 2017/0315231 A1 | 11/2017 | Wodrich |
| 2019/0184888 A1 | 6/2019 | Hori et al. |
| 2019/0293762 A1 | 9/2019 | Suzuki et al. |
| 2019/0353784 A1* | 11/2019 | Toledano ................ G01S 17/86 |

FOREIGN PATENT DOCUMENTS

| | | |
|---|---|---|
| JP | 2001260777 A | 9/2001 |
| JP | 2008105518 A | 5/2008 |
| JP | 2010002272 A | 1/2010 |
| JP | 2010185769 A | 8/2010 |
| JP | 2013029508 A | 2/2013 |
| JP | 2015076352 A | 4/2015 |
| JP | 2017134052 A | 8/2017 |
| WO | 2006035510 A1 | 4/2006 |
| WO | 2009153629 A1 | 12/2009 |
| WO | 2018030239 A1 | 2/2018 |

OTHER PUBLICATIONS

Written Opinion issued in International Application No. PCT/JP2019/008085, dated May 28, 2019 (10 pages).
Partial Supplementary European Search Report issued in European Application No. 19764283.8, dated Nov. 4, 2021 (21 pages).

* cited by examiner

FIG. 10A
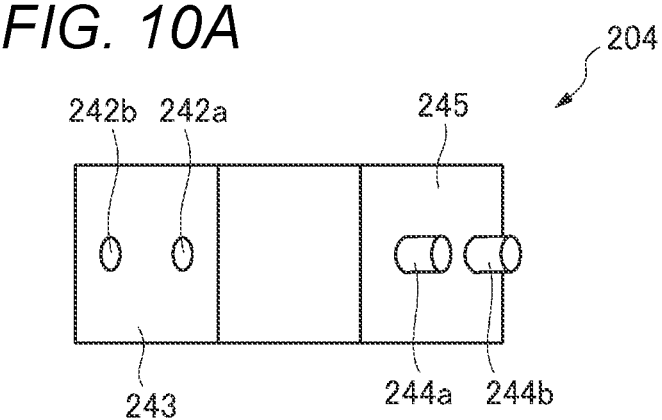
FIG. 10B  FIG. 10C  FIG. 10D
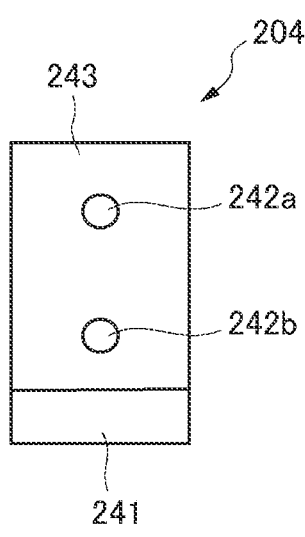 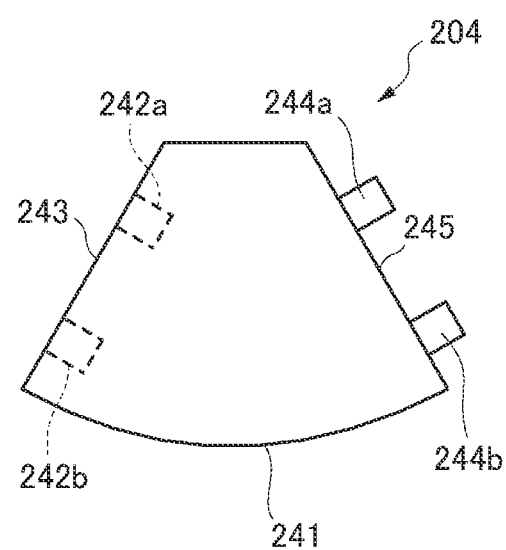 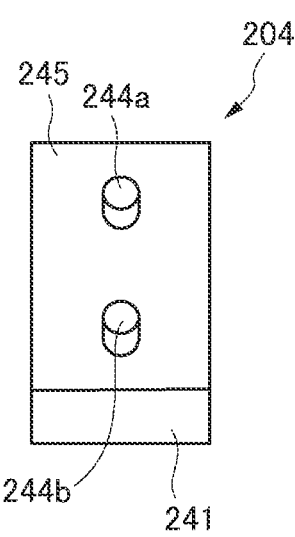
FIG. 10E
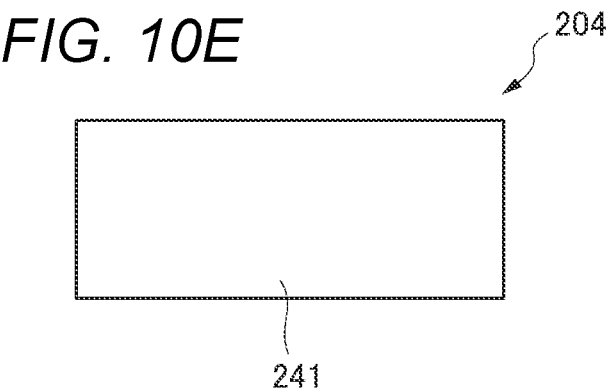

SENSOR SYSTEM, SENSOR MODULE, AND LAMP DEVICE

FIELD

The presently disclosed subject matter relates to a sensor system adapted to be mounted on a vehicle.

BACKGROUND

The presently disclosed subject matter relates to a sensor module adapted to be mounted on a vehicle.

The presently disclosed subject matter relates to a lamp device adapted to be mounted on a vehicle.

In order to realize the driving support technology of the vehicle, a sensor for detecting information in an outside area of the vehicle shall be mounted on the vehicle body. Examples of such sensors include LiDAR (Light Detection and Ranging sensors and cameras (see, e.g., Patent Document 1). Patent Document 2 discloses a lamp device in which a laser radar and a camera are arranged in a lamp chamber. Patent Document 3 discloses a lamp device in which a camera is arranged in a lamp chamber.

As used herein, the term "driving support" means control processing that at least partially performs at least one of driving operation (steering operation, acceleration, deceleration), monitoring of a driving environment, and backup of driving operation. That is, it includes not only the partial driving support such as braking function for collision avoidance and assisting function for lane-keeping, but also a full self-driving operation.

As the driving support technology of the vehicle is advanced, the number of sensors to be mounted tends to increase. Accordingly, the labor required for maintenance and inspection works or replacement works for the sensor also tends to increase.

When the lamp device as described above is mounted on a vehicle body, in addition to the posture and the lighting reference position of the lamp unit relative to the vehicle body, the posture and the detecting reference position of the sensor unit relative to the vehicle body is adjusted. As described above, information obtained by the sensor is used for the driving support. Accordingly, after the lamp device is mounted on the vehicle, it is not preferable that the detecting reference position of the sensor unit can be easily adjusted by general users.

CITATION LIST

Patent Document

Patent Document 1: Japanese Patent Publication No. 2010-185769 A
Patent Document 2: Japanese Patent Publication No. 2015-076352 A
Patent Document 3: Japanese Patent Publication No. 2008-105518 A

SUMMARY

Technical Problem

A first goal of the presently disclosed subject matter is to improve utilization efficiency of a space in which a plurality of sensors required for the driving support of a vehicle are arranged.

A second goal of the presently disclosed subject matter is to improve detection accuracy of a plurality of sensors required for the driving support of a vehicle.

A third goal of the presently disclosed subject matter is to reduce the labor required for the maintenance and inspection works or the replacement works of a plurality of sensors mounted on a vehicle.

A fourth goal of the presently disclosed subject matter is to restrain the adjustment action by the general users of the detecting reference position of the sensor unit in the lamp device.

Solution to Problem

In order to achieve the first goal described above, one illustrative aspect of the presently disclosed subject matter provides a sensor system adapted to be mounted on a vehicle, comprising:

a first sensor unit configured to detect first outside information of the vehicle based on a first detecting reference axis; and a second sensor unit configured to detect second outside information of the vehicle based on a second detecting reference axis, wherein the first detecting reference axis and the second detecting reference axis intersect with each other when viewed from an up-down direction of the vehicle.

According to such a configuration, a relatively large space can be secured in an area corresponding to an inner portion of the vehicle than the first sensor unit and the second sensor unit. In other words, even when a plurality of sensor units are used to obtain more outside information, it is possible to improve the utilization efficiency of the space in which the sensor units are arranged.

The above sensor system may be configured such that the first detecting reference axis and the second detecting reference axis intersect with each other.

According to such a configuration, the difference in the positions of the first sensor unit and the second sensor unit relative to the up-down direction of the vehicle is reduced, so that the enlargement of the sensor system in the same direction can be suppressed. In addition, since the reference height for acquiring the first image matches with the reference height for acquiring the second image, it is possible to suppress a load increase in subsequent information processing based on the first outside information and the second outside information.

The above sensor system may further comprise a translucent member defining an accommodation chamber accommodating the first sensor unit and the second sensor unit. The above sensor system may be configured such that: the translucent member has a recessed portion that is recessed toward the accommodation chamber; and the first detecting reference axis and the second detecting reference axis intersect the recessed portion.

The shorter the distance between the inner surface of the translucent member and each of the first sensor unit and the second sensor unit can easily suppress the quality deterioration of the image to be acquired. According to the configuration as described above, each of the first sensor unit and the second sensor unit can be arranged in the vicinity of the inner surface of the translucent member easily.

In this case, the sensor system may be configured such that: the recessed portion includes a first flat portion and a second flat portion; the first detecting reference axis intersects the first flat portion; and the second detecting reference axis intersects the second flat portion.

According to such a configuration, it is possible to suppress the quality deterioration of the first outside information and the quality deterioration of the second outside information caused by the reflection of the light generated in the translucent member.

The above sensor system may further comprise a signal processing device configured to acquire a first signal corresponding to the first outside information from the first sensor unit, and to acquire a second signal corresponding to the second outside information from the second sensor unit. The above sensor system may be configured such that the signal processing device is configured to generate, based on the first signal and the second signal, data corresponding to integrated data in which the first outside information and the second outside information are integrated.

According to such a configuration, the integrated image data can be used for the driving support of the vehicle. In a particular case where the driving support control is executed by a control device mounted on the vehicle such as an ECU, since the integration of the first outside information and the second outside information is performed by the signal processing device, it is possible to suppress an increase in the processing load in such a control device.

The above sensor system may further comprise a housing defining a lamp chamber accommodating a lamp unit. The above sensor system may be configured such that the first sensor unit and the second sensor unit are disposed in the lamp chamber.

Because of the function of supplying light to the outside of the vehicle, the lamp unit is generally disposed in a place with fewer shields. By disposing also first sensor unit and the second sensor unit in such a place, it is possible to efficiently obtain information in an outside area of the vehicle.

In addition, in a case where height information is acquired from an automatic leveling system of the vehicle, the height information may be shared with the lamp unit. In this case, an efficient system design is possible.

The above sensor system may be configured such that the first sensor unit and the second sensor unit include at least one of a LiDAR sensor unit, a camera unit, and a millimeter wave sensor unit.

In order to achieve the second goal described above, one illustrative aspect of the presently disclosed subject matter provides a sensor system adapted to be mounted on a vehicle, comprising:

a first sensor unit configured to detect information in an outside area of the vehicle;

a second sensor unit configured to detect information in an outside area of the vehicle, and to be coupled to the first sensor unit; and a regulating member configured to regulate an angle of a detecting reference direction of the second sensor unit relative to a detecting reference direction of the first sensor when the second sensor unit is coupled to the first sensor unit.

According to such a configuration, in a case where the first sensor unit and the second sensor unit are used for the driving support of a vehicle, the angle formed by the detecting reference direction of the first sensor unit and the detecting reference direction of the second sensor unit can be uniquely determined by merely coupling the first sensor unit and the second sensor unit. Accordingly, it is possible to improve the detection accuracy of the first sensor unit and the second sensor unit while reducing the workload for adjusting the detecting reference directions.

The above sensor system may be configured such that the regulating member is configured such that the angle is selectable from a plurality of values.

According to such a configuration, while reducing the workload for adjusting the detecting reference directions, it is also possible to improve the degree of freedom in selecting the detecting reference directions.

The above sensor system according may further comprise: a support commonly supporting the first sensor unit and the second sensor unit; and an adjustment mechanism configured to adjust at least one of a position and a posture of the support relative to the vehicle.

Prior to shipment of the sensor system, the angle formed by the detecting reference direction of the first sensor unit and the detecting reference direction of the second sensor unit is uniquely determined by the regulating members described above. However, when the sensor system is mounted on the vehicle, at least one of the detecting reference directions of both sensor units may deviate from the desired direction due to tolerances of the vehicle body parts or misalignment of the sensor system with respect to the vehicle body. Accordingly, after the sensor system is mounted on the vehicle, readjustment of the detecting reference directions is performed. In the above configuration, since the first sensor unit and the second sensor unit are supported by a common support, the detecting reference directions of both sensor units can be collectively adjusted by the adjustment mechanism. Accordingly, even in a case where a plurality of sensor units are used for the driving support, it is possible to reduce the workload for adjusting the detecting reference direction of each sensor unit.

The above sensor system may further comprise a housing defining a lamp chamber accommodating a lamp unit. The above sensor system may be configured such that the first sensor unit and the second sensor unit are disposed in the lamp chamber.

Because of the function of supplying light to the outside of the vehicle, the lamp unit is generally disposed in a place with fewer shields. By disposing also first sensor unit and the second sensor unit in such a place, it is possible to efficiently obtain information in an outside area of the vehicle.

The above sensor system may be configured such that the first sensor unit and the second sensor unit include at least one of a LiDAR sensor unit, a camera unit, and a millimeter wave sensor unit.

In order to achieve the third goal described above, one illustrative aspect of the presently disclosed subject matter provides a sensor module adapted to be mounted on a vehicle, comprising:

a housing defining an accommodation chamber;

a support configured to be attached to and detached from the housing from the outside of the housing;

a first sensor unit supported by the support; and a second sensor unit supported by the support, wherein when the support is attached to the housing, the support defines a portion of the accommodation chamber, and the first sensor unit and the second sensor unit are disposed in the accommodation chamber.

According to such a configuration, the maintenance and inspection work or the replacement work of the plural sensors can be performed only by attaching and detaching the support with respect to the housing from the outside of the housing. Accordingly, it is possible to reduce the labor required for maintenance and inspection works or the replacement works of a plurality of sensors mounted on the vehicle.

The above sensor module may be configured such that the first sensor unit and the second sensor unit are entirely located inside an outer edge of the support when viewed from an attaching direction of the support.

According to such a configuration, it is possible to eliminate additional effort such as tilting the support when the first sensor unit and the second sensor unit are caused to pass through the opening formed in the housing to carry out the attachment of the support. Since the attachment and detachment of the support with respect to the housing can be performed with a linear operation, it is possible to suppress degradation in work efficiency.

The above sensor module may be configured such that the support and the housing have such shapes that regulate a posture of the support when the support is attached to the housing.

According to such a configuration, it is possible to avoid a situation in which the first sensor unit and the second sensor unit are disposed in the accommodation chamber in a wrong posture. In addition, since the posture of the support at the time of attachment to the housing can be determined without hesitation, it is possible to suppress degradation in the work efficiency.

The above sensor module may be configured such that an attaching direction of the support is along a detecting reference direction of the first sensor unit and a detecting reference direction of the second sensor unit.

The projected area of each sensor unit tends to be small when viewed from the detecting reference direction. Accordingly, by aligning the attaching direction of the support along the detecting reference direction of each sensor unit, it is possible to reduce the dimensions of the support.

The above sensor module may be configured such that a detecting reference position of the first sensor unit is not offset from a detecting reference position of the second sensor unit in a front-rear direction of the vehicle.

According to such a configuration, collective adjustment of the detecting reference direction of the first sensor unit and the detecting reference direction of the second sensor unit by adjusting the posture of the support is facilitated.

The above sensor module may be configured such that a detecting reference position of the first sensor unit is not offset from a detecting reference position of the second sensor unit in an up-down direction of the vehicle.

Even with such a configuration, collective adjustment of the detecting reference direction of the first sensor unit and the detecting reference direction of the second sensor unit by adjusting the posture of the support is facilitated.

The above sensor module may be configured such that the first sensor unit and the second sensor unit are so configured to be attached to and detached from the support individually.

According to such a configuration, since the sensor unit that does not require repair or replacement can be continuously used, it is possible to economically operate the sensor module.

The above sensor module may be configured such that a gathering member configured to gather a signal line connected to the first sensor unit and a signal line connected to the second sensor unit is provided with the support.

In a case where the sensor module includes a plurality of sensor units, it is necessary to route a plurality of signal lines. According to the configuration as described above, since the plural signal lines are gathered in the support, the handling of the plural signal lines is facilitated. Accordingly, it is possible to suppress degradation in the work efficiency.

The above sensor module may be configured such that a control device configured to control at least one of an operation of the first sensor unit and an operation of the second sensor unit is supported by the support.

According to such a configuration, the processing that shall be executed by an integration control device such as an ECU mounted on the vehicle can be partially shared by the control device. Accordingly, the processing load on the integration control device can be reduced.

The above sensor module may be configured such that the support is made of material containing metal.

According to such a configuration, heat generated by the operation of each of the first sensor unit and the second sensor unit can be efficiently dissipated. In a case where the control device is supported by the support, heat generated by the operation of the control device can also be efficiently dissipated.

The above sensor module may further comprise a sealing member configured to be placed between the support and the housing.

According to such a configuration, even if the support defining a part of the accommodation chamber is made detachable from the outside of the housing, it is possible to secure water resistance and dust resistance of the accommodation chamber.

The above sensor module may be configured such that at least one of the first sensor unit and the second sensor unit is a camera unit provided with a shielding cover surrounding an image pickup face of the camera unit.

According to such a configuration, it is possible to suppress the incidence of disturbance light on the image pickup face. Accordingly, it is possible to suppress a decrease in the detection accuracy of the information of an outside area of the vehicle by the camera unit.

The above sensor module may be configured such that a first adjustment mechanism configured to adjust a detecting reference direction of the first sensor unit and a second adjustment mechanism configured to adjust a detecting reference direction of the second sensor unit are supported by the support.

According to such a configuration, adjustment of the detecting reference direction of a particular sensor unit can be performed without being constrained by the detecting reference direction of another sensor unit.

The above sensor module may further comprise a third sensor module supported by the support.

According to such a configuration, while increasing the information of the acquired vehicle outside, it is possible to reduce the labor required for the maintenance and inspection works or the replacement works of the sensor.

In order to achieve the third goal described above, one illustrative aspect of the presently disclosed subject matter provides a sensor module adapted to be mounted on a vehicle, comprising:
  a housing defining an accommodation chamber;
  a support configured to be attached to and detached from the housing from the outside of the housing;
  a sensor unit supported by the support; and
  a lamp unit supported by the support,
  wherein when the support is attached to the housing, the support defines a portion of the accommodation chamber, and the sensor unit and the lamp unit are disposed in the accommodation chamber.

According to such a configuration, the maintenance and inspection works or the replacement works of the sensor unit and the lamp unit can be performed by merely attaching and detaching the support with respect to the housing from the outside of the housing. Accordingly, it is possible to reduce the labor required for maintenance and inspection works and replacement works of the sensor module in which the sensor unit and the lamp unit are disposed in the accommodation chamber.

In order to achieve the fourth goal described above, one illustrative aspect of the presently disclosed subject matter provides a lamp device adapted to be mounted on a vehicle, comprising:

a lamp unit configured to emit visible light;
a sensor unit configured to detect information in an outside area of the vehicle;
a housing defining a space accommodating the lamp unit and the sensor unit;
a first aiming mechanism configured to adjust a lighting reference position of the lamp unit;
a second aiming mechanism disposed in the space and configured to adjust a detecting reference position of the sensor unit; and
a switching device configured to establish a first state in which only the first aiming mechanism is allowed to be operated from the outside of the housing and a second state in which the second aiming mechanism is operated in response to an operation of the first aiming mechanism.

According to such a configuration, unless the switching device establishes the second state, it is impossible to operate the second aiming mechanism accommodated in the housing. Accordingly, it is possible to restrain the general users from performing the adjustment of the detecting reference position of the sensor unit provided in the lamp device.

The above lamp device may be configured such that the switching device is configured to further establish a third state in which only the second aiming mechanism is allowed to be operated.

According to such a configuration, since the lighting reference position of the lamp unit and the detecting reference position of the sensor unit can be adjusted independently, the work efficiency is improved.

The above lamp device may be configured such that: a part of the switching device is detachable from the outside of the housing; and only the first state is established when the part of the switching device is detached.

According to such a configuration, by managing the part of the switching device so as not to be available to the general user, it is possible to restrain the general users from performing the adjustment of the detecting reference position of the sensor unit.

Alternatively, the above lamp device may be configured such that at least a part of the switching device is disposed in the space.

According to such a configuration, since there is no need to be aware of the location of the detachable member, it is possible to facilitate management of the switching device.

The above lamp device may be configured such that the sensor unit includes at least one of a LiDAR sensor unit, a camera unit, and a millimeter wave sensor unit.

As used herein, the term "sensor unit" means a constituent unit of a component that can be distributed by itself as a single unit while providing a desired information detecting function.

As used herein, the term "lamp unit" means a constituent unit of a component that can be distributed by itself as a single unit while providing a desired lighting function.

BRIEF DESCRIPTION OF DRAWINGS

FIGS. 10A to 10E illustrate appearances of a sensor unit according to the fourth embodiment.

DESCRIPTION OF EMBODIMENTS

Examples of embodiments will be described below in detail with reference to the accompanying drawings. In each of the drawings used in the following description, the scale is appropriately changed in order to make each of the members have a recognizable size.

Figure 1A:
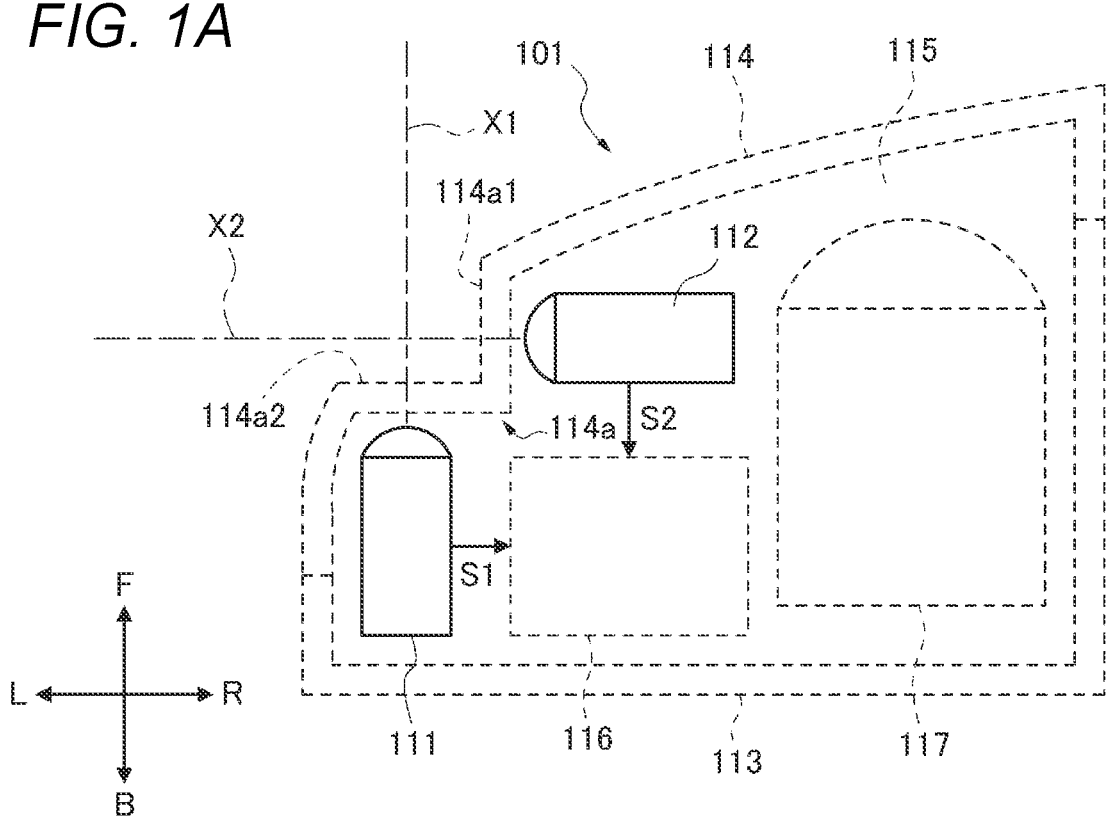
FIGS. 1A and 1B are views for illustrating a configuration of a sensor system according to the first embodiment.
Figure 1B:
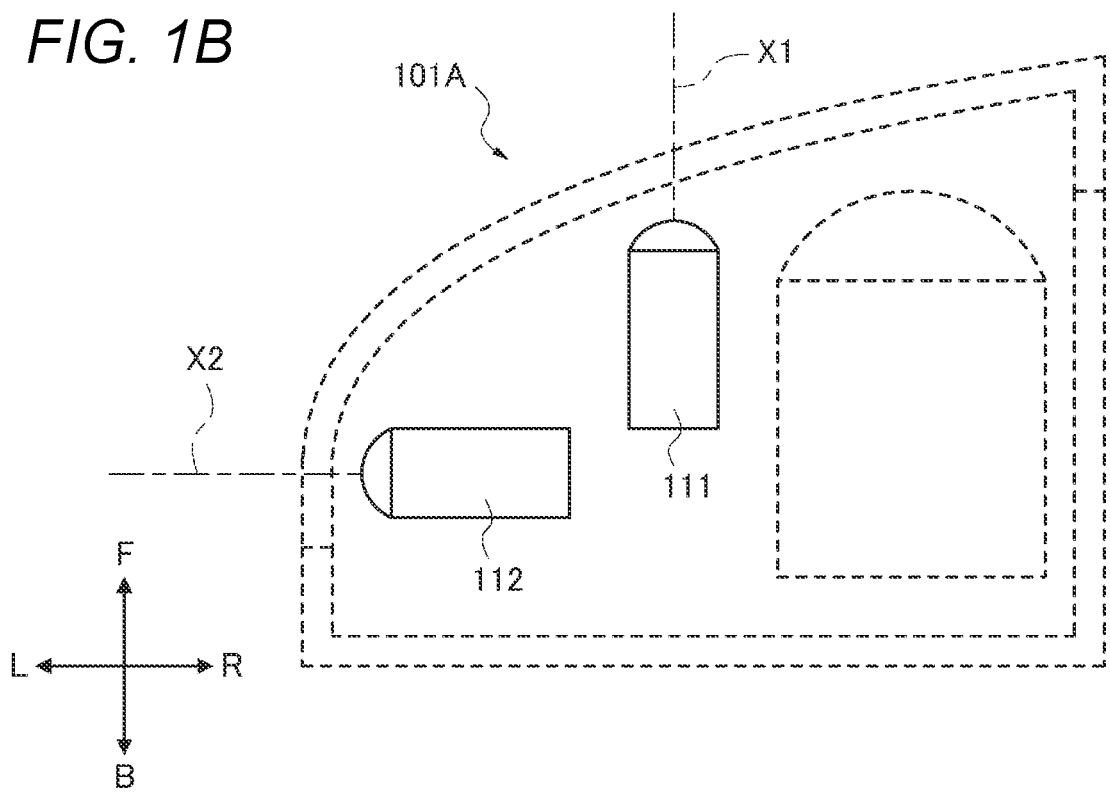
Figure 2:
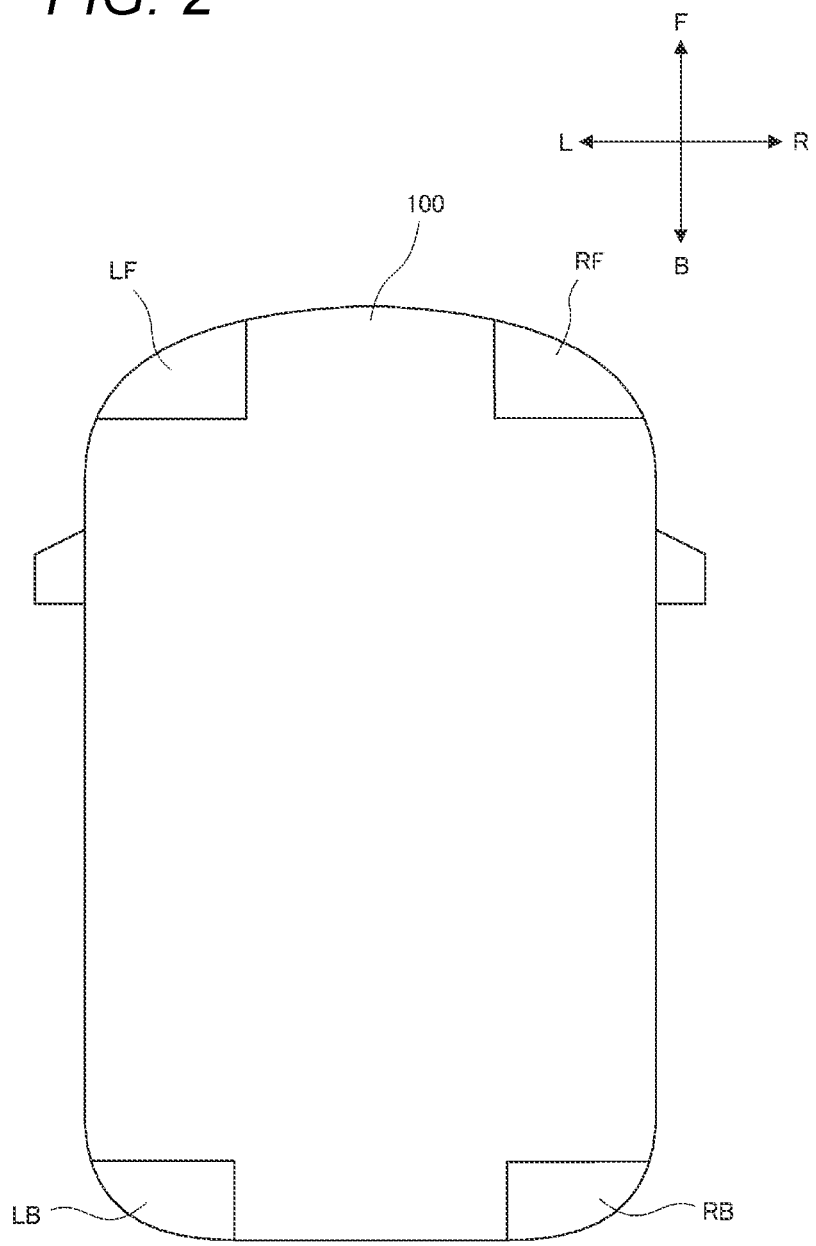
FIG. 2 illustrates a position of the sensor system of FIG. 1A in a vehicle.

In FIGS. 1A to 2, an arrow F represents a forward direction of the illustrated structure. An arrow B represents a rearward direction of the illustrated structure. An arrow L represents a leftward direction of the illustrated structure. An arrow R represents a rightward direction of the illustrated structure. The terms "left" and "right" used in the following descriptions represent the left-right directions as viewed from the driver's seat.

FIG. 1A illustrates a configuration of a left front sensor system 101 according to the first embodiment. The left front sensor system 101 is mounted on the left front corner portion LF of the vehicle 100 illustrated in FIG. 2. A right front sensor system having a configuration symmetrical with the left front sensor system 101 relative to the left-right direction is mounted on the right front corner portion RF of the vehicle 100.

The left front sensor system 101 includes a first camera unit 111. The first camera unit 111 is a device for acquiring a first image of an area including at least ahead of the vehicle 100.

The first camera unit 111 is configured to output a first signal S1 corresponding to the acquired first image. The first camera unit 111 may be a visible light camera or an infrared camera. The first camera unit 111 is an example of the first sensor unit.

The first camera unit 111 has a first optical axis X1. The first optical axis X1 may define a reference direction when the first camera unit 111 acquires the first image. That is, the first camera unit 111 is configured to acquire a first image of an area including at least ahead of the vehicle 100 based on the first optical axis X1. The first optical axis X1 is an example of the first detecting reference axis. The acquisition of the first image is an example of the detection of the first outside information of the vehicle 100.

The left front sensor system 101 includes a second camera unit 112. The second camera unit 112 is a device for acquiring a second image of an area including at least on the left of the vehicle 100. The second camera unit 112 is configured to output a second signal S2 corresponding to the acquired second image. The second camera unit 112 may be a visible light camera or an infrared camera. The second camera unit 112 is an example of the second sensor unit.

The second camera unit 112 has a second optical axis X2. The second optical axis X2 may define a reference direction when the second camera unit 112 acquires the second image. That is, the second camera unit 112 is configured to acquire a second image of an area including at least on the left of the vehicle 100 based on the second optical axis X2. The second optical axis X2 is an example of the second detecting reference axis. The acquisition of the second image is an example of the detection of the second outside information of the vehicle 100.

The left front sensor system 101 includes a housing 113 and a translucent member 114. The housing 113 and the translucent member 114 define an accommodation chamber 115.

The first camera unit 111 and the second camera unit 112 are disposed in the accommodation chamber 115. The first camera unit 111 and the second camera unit 112 are arranged such that the first optical axis X1 and the second optical axis X2 intersect with each other when viewed from the up-down direction of the vehicle 100.

FIG. 1B illustrates a left front sensor system 101A according to a comparative example. In the comparative example, the first camera unit 111 and the second camera unit 112 are arranged such that the first optical axis X1 and the second optical axis X2 do not intersect with each other. Compared to such a configuration, it is understandable that a relatively large space can be easily secured in an area corresponding to an inner portion of the vehicle 100 than the first camera unit 111 and the second camera unit 112. In other words, even when a plurality of camera units are used to obtain more image information, it is possible to improve the utilization efficiency of the space in which the camera units are arranged.

If the first optical axis X1 and the second optical axis X2 intersect with each other when viewed from the up-down direction of the vehicle 100, the first optical axis X1 and the second optical axis X2 may not intersect with each other when viewed from the left-right direction or the front-rear direction of the vehicle 100. However, it is preferable that the first optical axis X1 and the second optical axis X2 actually intersect with each other.

According to such a configuration, the difference in the positions of the first camera unit 111 and the second camera unit 112 relative to the up-down direction of the vehicle 100 is reduced, so that the enlargement of the left front sensor system 101 in the same direction can be suppressed. In addition, since the reference height for acquiring the first image matches with the reference height for acquiring the second image, it is possible to suppress a load increase in the image processing based on the first signal S1 outputted from the first camera unit 111 and the second signal S2 outputted from the second camera unit 112.

As illustrated in FIG. 1A, the translucent member 114 may have a recessed portion 114a. The recessed portion 114a is a portion recessed toward the accommodation chamber 115. In this case, the first camera unit 111 and the second camera unit 112 may be arranged such that the first optical axis X1 and the second optical axis X2 intersect the recessed portion 114a.

The shorter the distance between the inner surface of the translucent member 114 and each of the first camera unit 111 and the second camera unit 112 can easily suppress the quality deterioration of the image to be acquired. According to the configuration as described above, each of the first camera unit 111 and the second camera unit 112 can be arranged in the vicinity of the inner surface of the translucent member 114 easily. Accordingly, it is possible to suppress the quality deterioration of the first image to be acquired by the first camera unit 111 and the quality deterioration of the second image to be acquired by the second camera unit 112.

As illustrated in FIG. 1A, the recessed portion 114a may include a first flat portion 114a1 and a second flat portion 114a2. In this case, the first camera unit 111 may be disposed such that the first optical axis X1 intersects the first flat portion 114a1. The second camera unit 112 may be disposed such that the second optical axis X2 intersects the second flat portion 114a2. Accordingly, the first camera unit 111 acquires the first image based on the light that has passed through the first flat portion 114a1 of the translucent member 114. The second camera unit 112 acquires the second image based on the light that has passed through the second flat portion 114a2 of the translucent member 114.

According to such a configuration, it is possible to suppress the quality deterioration of the first image and the quality deterioration of the second image caused by the reflection of the light generated in the translucent member 114. Accordingly, it is preferable that the first camera unit 111 is disposed such that the first optical axis X1 is orthogonal to the first flat portion 114a1. The second camera unit 112 is preferably disposed such that the second optical axis X2 is orthogonal to the second flat portion 114a2.

As illustrated in FIG. 1A, the left front sensor system 101 may include a signal processing device 116. The signal processing device 116 may be implemented by a general-purpose microprocessor operating in conjunction with a general-purpose memory. Examples of the general-purpose microprocessor include a CPU, an MPU, and a GPU.

Examples of the general-purpose memory include a RAM and a ROM. In this case, a computer program for implementing the processing described later may be stored in the ROM. The general-purpose microprocessor specifies at least a portion of the program stored in the ROM, load the program on the RAM, and execute the processing in cooperation with the RAM. The signal processing device 116 may be implemented by a microcontroller, an ASIC, an FPGA, or other dedicated integrated circuits capable of executing a computer program for implementing the processes described later. The signal processing device 116 may be implemented by a combination of a general-purpose microprocessor and a dedicated integrated circuit.

The signal processing device 116 may be implemented as a device secured to the housing 113 or as a control device mounted on the vehicle 100 such as an ECU.

The signal processing device 116 acquires the first signal S1 outputted from the first camera unit 111 and the second signal S2 outputted from the second camera unit 112. The signal processing device 116 is configured to generate integrated image data based on the first signal S1 and the second signal S2. As described above, the first signal S1 corresponds to the first image of the area including at least ahead of the vehicle 100. The second signal S2 corresponds to the second image of the area including at least on the left of the vehicle 100. The integrated image data is data corresponding to an image in which the first image and the second image are integrated.

According to such a configuration, the integrated image data can be used for the driving support of the vehicle 100. In a particular case where the driving support control is executed by the control device mounted on the vehicle 100 such as the ECU, since the integration of the first image and the second image is performed by the signal processing device 116, it is possible to suppress an increase in the processing load in such a control device.

As illustrated in FIG. 1A, the left front sensor system 101 may include a lamp unit 117. The lamp unit 117 is a device for emitting visible light to the outside of the vehicle 100. The lamp unit 117 is accommodated in the accommodation chamber 115 together with the first camera unit 111 and the second camera unit 112. Examples of the lamp unit 117 include a headlamp unit, a clearance lamp unit, a direction indicator lamp unit, and a fog lamp unit.

Because of the function of supplying light to the outside of the vehicle 100, the lamp unit 117 is generally disposed in a place where there are few shields, such as the left front corner portion LF described above. By disposing also the first camera unit 111 and the second camera unit 112 in such a place, it is possible to efficiently obtain information in an outside area of the vehicle 100.

The first embodiment is a mere example for facilitating understanding of the gist of the presently disclosed subject matter. The configuration according to the first embodiment can be appropriately modified without departing from the gist of the presently disclosed subject matter.

In the first embodiment, the left front sensor system 101 including the first camera unit 111 and the second camera unit 112 is illustrated. However, at least one of the first camera unit 111 and the second camera unit 112 may be replaced by either a LiDAR sensor unit or a millimeter wave sensor unit.

The LiDAR sensor unit has a configuration for emitting non-visible light and a configuration for detecting returned light as a result of the non-visible light being reflected by an object existing in at least the outside area of the vehicle. As required, the LiDAR sensor unit may include a scan device that sweeps the non-visible light to change the light emitting direction (i.e., the detecting direction). For example, infrared light having a wavelength of 905 nm is used as the non-visible light.

The LiDAR sensor unit can obtain the distance to the object associated with the returned light, for example, based on the time period from the time when the non-visible light is emitted in a certain direction to the time when the returned light is sensed. Further, by accumulating such distance information in association with the detecting position, it is possible to acquire information as to the shape of the object associated with the returned light. Additionally or alternatively, information as to an attribute such as the material of the object associated with the returned light can be acquired based on the difference in waveforms of the emitted light and the returned light.

In a case where the LiDAR sensor unit is used, the optical axis of the camera unit described with reference to the first optical axis X1 and the second optical axis X2 may be replaced with the detecting reference axis of the LiDAR sensor unit. The detecting reference axis defines the detecting reference direction of the LiDAR sensor unit. The LiDAR sensor unit detects information in an outside area of the vehicle 100 based on the detecting reference axis.

The millimeter wave sensor unit has a configuration for transmitting a millimeter wave and a configuration for receiving a reflected wave as a result of the millimeter wave being reflected by an object existing in an outside area of the vehicle 100. Examples of frequencies of millimeter waves include 24 GHz, 26 GHz, 76 GHz, and 79 GHz. The millimeter wave sensor unit can obtain the distance to the object associated with the reflected wave, for example, based on the time period from the time when the millimeter wave is transmitted in a certain direction to the time when the reflected wave is received. In addition, by accumulating such distance data in association with the detecting position, it is possible to acquire information as to the shape of the object associated with the reflection wave.

In a case where the millimeter wave sensor unit is used, the optical axis of the camera unit described with reference to the first optical axis X1 and the second optical axis X2 may be replaced with the detecting reference axis of the millimeter wave sensor unit. The detecting reference axis defines the detecting reference direction of the millimeter wave sensor unit. The millimeter wave sensor unit detects information in an outside area of the vehicle 100 based on the detecting reference axis.

In a case where only the infrared camera unit and the millimeter wave sensor unit are disposed in the accommodation chamber 115, the translucent member 114 defining the accommodation chamber 115 need not to be transparent. As used herein, the term "translucent" means capable of transmitting light of a wavelength used by the sensor unit to detect information in an outside area of the vehicle 100.

The configuration of the left front sensor system 101 is also applicable to a left rear sensor system. The left rear sensor system is mounted on the left rear corner portion LB of the vehicle 100 illustrated in FIG. 2. The basic configuration of the left rear sensor system may be symmetrical with the left front sensor system 101 relative to the front-rear direction.

The configuration of the left front sensor system 101 is also applicable to a right rear sensor system. The right rear sensor system is mounted on the right rear corner portion RB of the vehicle 100 illustrated in FIG. 2. The basic configuration of the rear right and left sensor system is symmetrical with the left rear sensor system described above relative to the left-right direction.

Another embodiment examples will be described in detail below with reference to FIGS. 3A to 12. In each of the drawings, the scale is appropriately changed in order to make each of the members have a recognizable size.

The expressions "top", "bottom", "front", "rear", "left" and "right" in the following description are used for convenience of explanation, and are not intended to limit the posture in actual use.

Figure 3A:
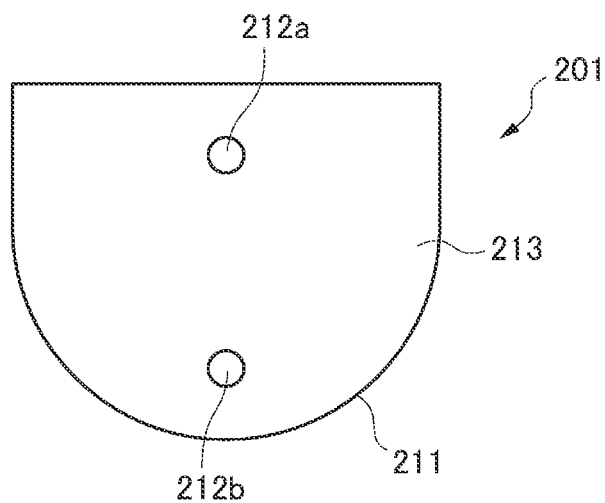
FIGS. 3A to 3D illustrate appearances of a first sensor unit according to the second embodiment.
Figure 3B:
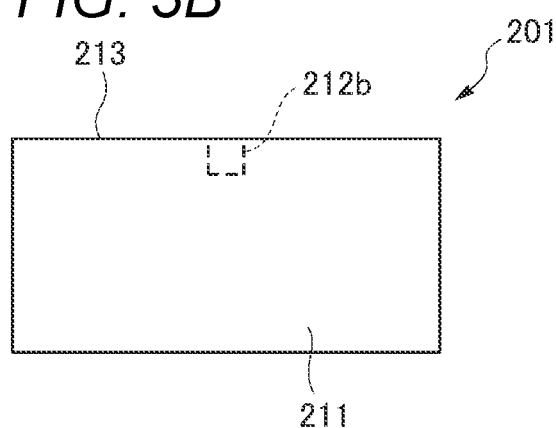
Figure 3D:
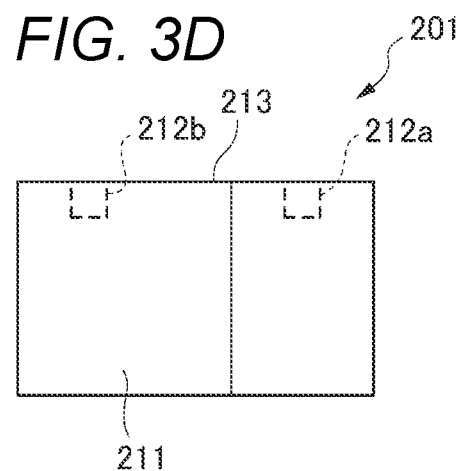
Figure 3C:
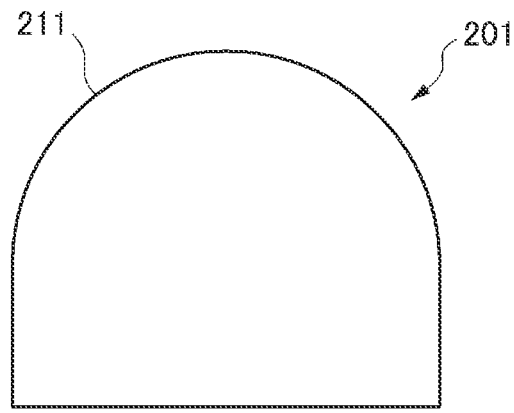

FIG. 3A illustrates an appearance of a first sensor unit 201 according to the second embodiment as viewed from the top side. FIG. 3B illustrates an appearance of the first sensor unit 201 as viewed from the front side. FIG. 3C illustrates an appearance of the first sensor unit 201 as viewed from the bottom side. FIG. 3D illustrates an appearance of the first sensor unit 201 as viewed from the right side. The appearance viewed from the left side is symmetrical with the appearance viewed from the right side relative to the left-right direction.

The first sensor unit 201 is a device adapted to be mounted on a vehicle for acquiring information in an outside area of the vehicle. For example, the first sensor unit 201 may be any of a LiDAR sensor unit, a camera unit, or a millimeter wave sensor unit.

The LiDAR sensor unit has a configuration for emitting non-visible light and a configuration for detecting returned light as a result of the non-visible light being reflected by an object existing in at least the outside area of the vehicle. As required, the LiDAR sensor unit may include a scan device that sweeps the non-visible light to change the light emitting direction (i.e., the detecting direction). For example, infrared light having a wavelength of 905 nm is used as the non-visible light.

The camera unit is a device for acquiring an image as information in an outside area of the vehicle. The image may include at least one of a still image and a video image. The camera unit may include a camera sensitive to visible light or a camera sensitive to infrared light.

The millimeter wave sensor unit has a configuration for transmitting a millimeter wave and a configuration for receiving a reflected wave as a result of the millimeter wave being reflected by an object existing in an outside area of the vehicle 100. Examples of frequencies of millimeter waves include 24 GHz, 26 GHz, 76 GHz, and 79 GHz.

The first sensor unit 201 includes a detecting face 211. The detecting face 211 is a portion, through which light relating to detection of information passes, of an outer face forming a housing of the first sensor unit 201.

The first sensor unit 201 includes a first recess 212a and a second recess 212b. The first recess 212a and the second recess 212b are formed on a top face 213 of the first sensor unit 201.

Figure 4A:
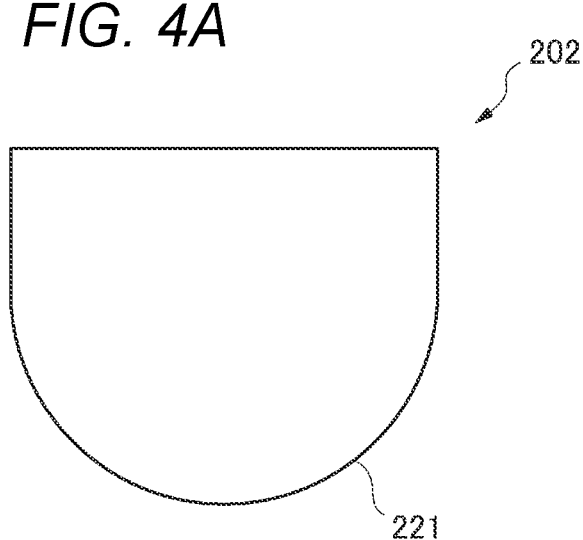
FIGS. 4A to 4D illustrate appearances of a second sensor unit according to the second embodiment.
Figure 4B:
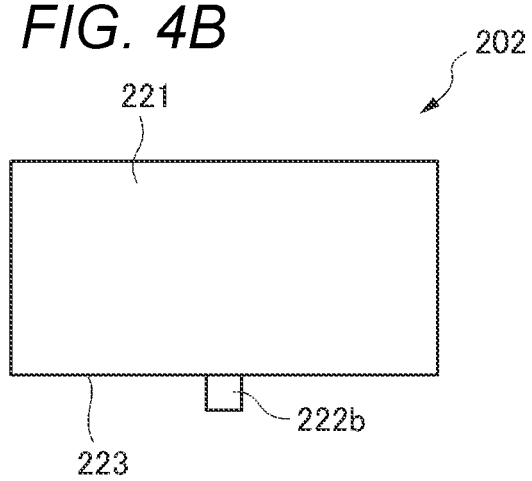
Figure 4D:
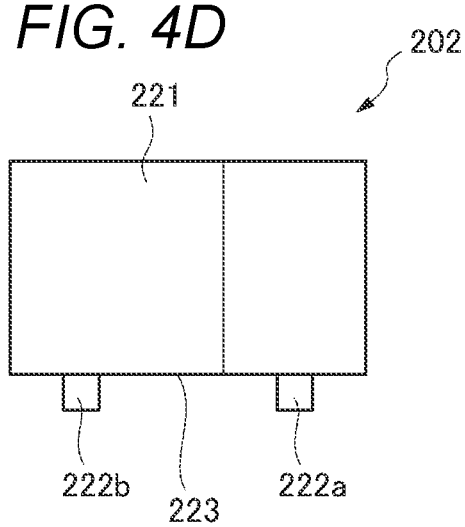
Figure 4C:
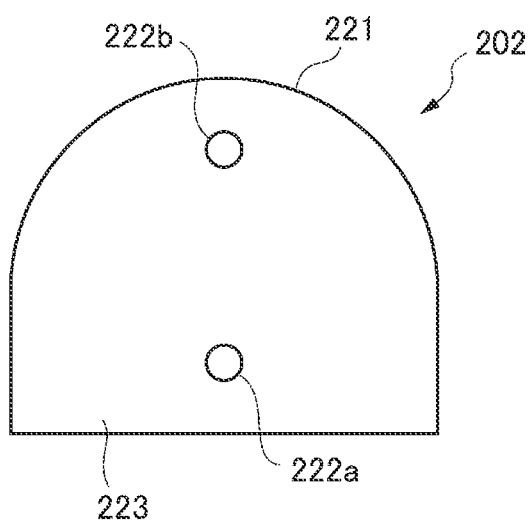

FIG. 4A illustrates an appearance of a second sensor unit 202 according to the second embodiment as viewed from the top side. FIG. 4B illustrates the second sensor unit 202 as viewed from the front side. FIG. 4C illustrates the second sensor unit 202 as viewed from the bottom side. FIG. 4D illustrates the second sensor unit 202 as viewed from the right side. The appearance viewed from the left side is symmetrical with the appearance viewed from the right side relative to the left-right direction.

The second sensor unit 202 is a device adapted to be mounted on a vehicle for acquiring information in an outside area of the vehicle. For example, the second sensor unit 202 may be any of a LiDAR sensor unit, a camera unit, or a millimeter wave sensor unit.

The second sensor unit 202 includes a detecting face 221. The detecting face 221 is a portion, through which light relating to detection of information passes, of an outer face forming a housing of the second sensor unit 202.

The second sensor unit 202 includes a first protrusion 222a and a second protrusion 222b. The first protrusion 222a and the second protrusion 222b are formed on a bottom face 223 of the second sensor unit 202.

Figure 5A:
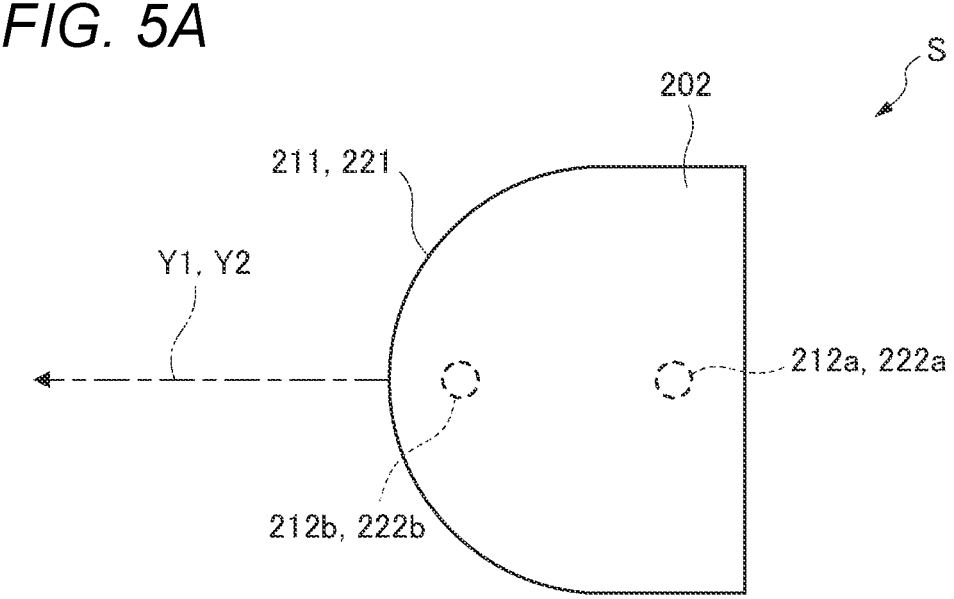
FIGS. 5A and 5B are views for illustrating a configuration of a sensor system according to the second embodiment.
Figure 5B:
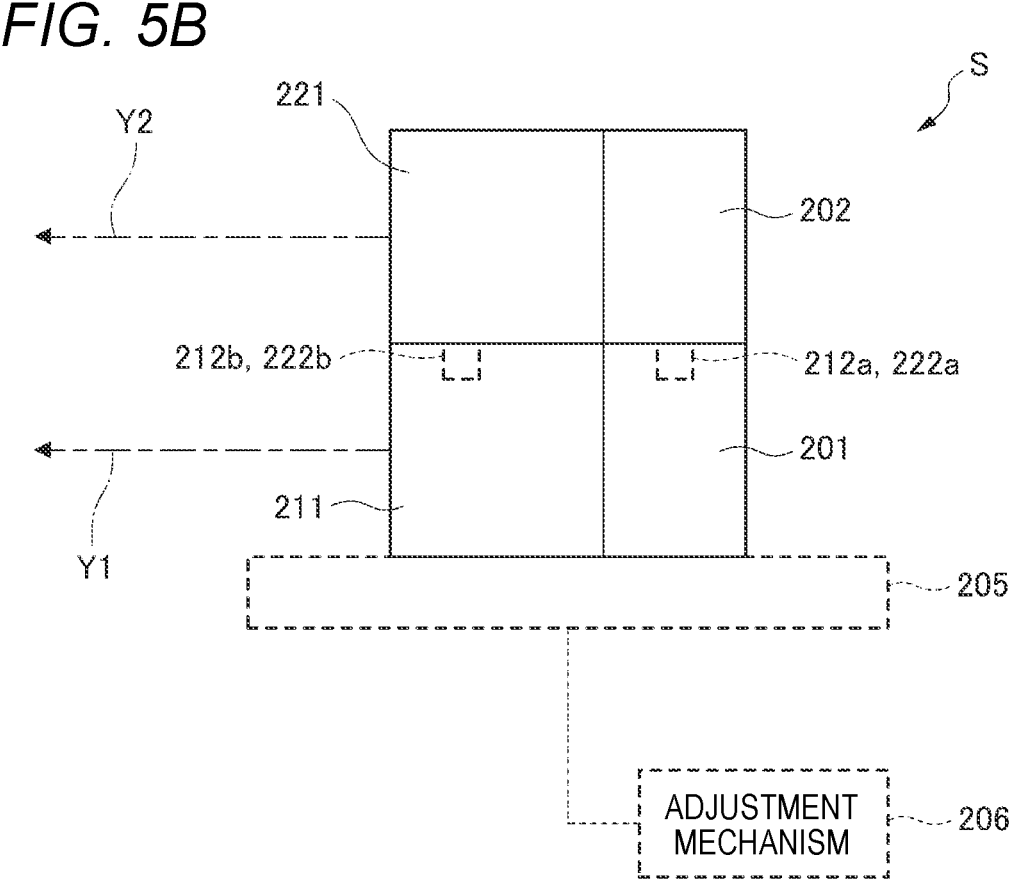

The first sensor unit 201 and the second sensor unit 202 can be coupled to each other. The first protrusion 222a and the second protrusion 222b of the second sensor unit 202 are fitted into the first recess 212a and the second recess 212b of the first sensor unit 201, respectively, whereby coupling is performed. FIG. 5A illustrates the first sensor unit 201 and the second sensor unit 202 in the coupled state as viewed from the top side. The first sensor unit 201 and second sensor unit 202 as coupled constitute a sensor system S. FIG. 5B illustrates the first sensor unit 201 and the second sensor unit 202 in the coupled state as viewed from the right side.

In this example, when the first protrusion 222a is fitted into the first recess 212a and the second protrusion 222b is fitted into the second recess 212b, the postures of the first sensor unit 201 and the second sensor unit 202 are regulated so that a detecting reference direction Y1 of the first sensor unit 201 coincides with a detecting reference direction Y2 of the second sensor unit 202 in a plane intersecting the coupling direction. In other words, when the first sensor unit 201 and the second sensor unit 202 are coupled to each other, the first recess 212a, the second recess 212b, the first protrusion 222a, and the second protrusion 222b regulate the angle of the detecting reference direction Y2 of the second sensor unit 202 with respect to the detecting reference direction Y1 of the first sensor unit 201. Each of the first recess 212a, the second recess 212b, the first protrusion 222a, and the second protrusion 222b are an example of the regulating member.

According to such a configuration, in a case where the first sensor unit 201 and the second sensor unit 202 are used for the driving support of a vehicle, the angle formed by the detecting reference direction Y1 of the first sensor unit 201 and the detecting reference direction Y2 of the second sensor unit 202 can be uniquely determined by merely coupling the first sensor unit 201 and the second sensor unit 202. Accordingly, it is possible to improve the detection accuracy of the first sensor unit 201 and the second sensor unit 202 while reducing the workload for adjusting the detecting reference directions.

Figure 6A:
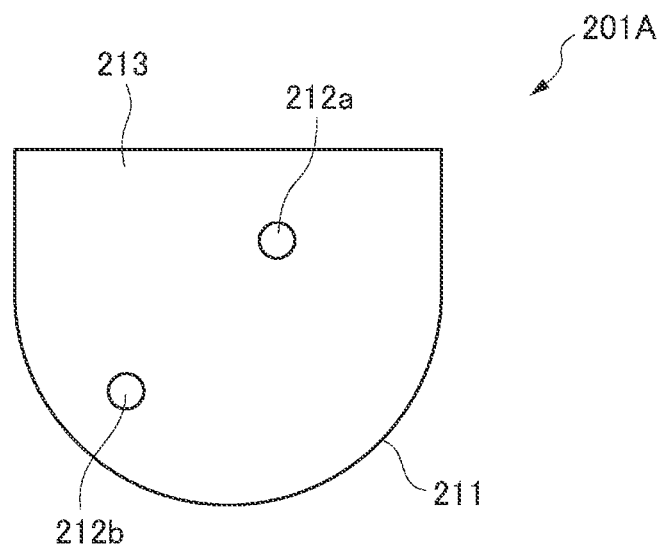
FIGS. 6A and 6B are views for illustrating a configuration of a sensor system according to the first modification of the second embodiment.

FIG. 6A illustrates an appearance of a first sensor unit 201A according to the first modification of the second embodiment as viewed from the top side. Components that are the same as or equivalent to those of the first sensor unit 201 are assigned with the same reference legends, and repetitive descriptions for those will be omitted. The first sensor unit 201A differs from the first sensor unit 201 in the position where the first recess 212a is formed and the position where the second recess 212b is formed.

Figure 6B:
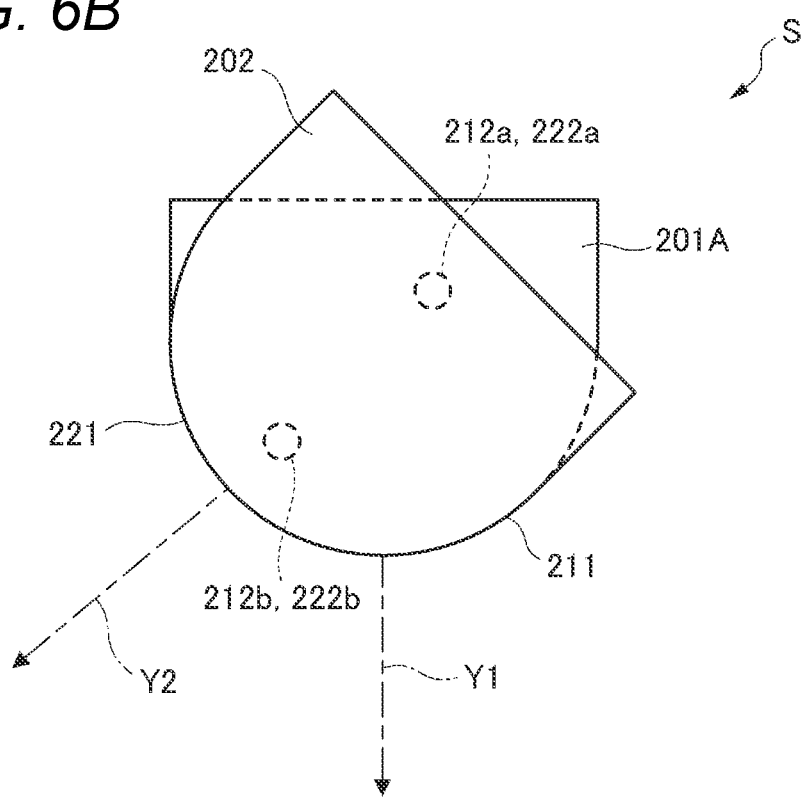

FIG. 6B illustrates an appearance when the second sensor unit 202 is coupled to the first sensor unit 201A as viewed from the top side. In this example, when the first protrusion 222a is fitted into the first recess 212a and the second protrusion 222b is fitted into the second recess 212b, the postures of the first sensor unit 201 and the second sensor unit 202 are regulated so that a detecting reference direction Y1 of the first sensor unit 201A forms a prescribed angle with a detecting reference direction Y2 of the second sensor unit 202 in a plane intersecting the coupling direction.

Even with such a configuration, in a case where the first sensor unit 201A and the second sensor unit 202 are used for the driving support of a vehicle, the angle formed by the detecting reference direction Y1 of the first sensor unit 201A and the detecting reference direction Y2 of the second sensor unit 202 can be uniquely determined by merely coupling the first sensor unit 201A and the second sensor unit 202. Accordingly, it is possible to improve the detection accuracy of the first sensor unit 201A and the second sensor unit 202 while reducing the workload for adjusting the detecting reference directions.

Figure 7A:
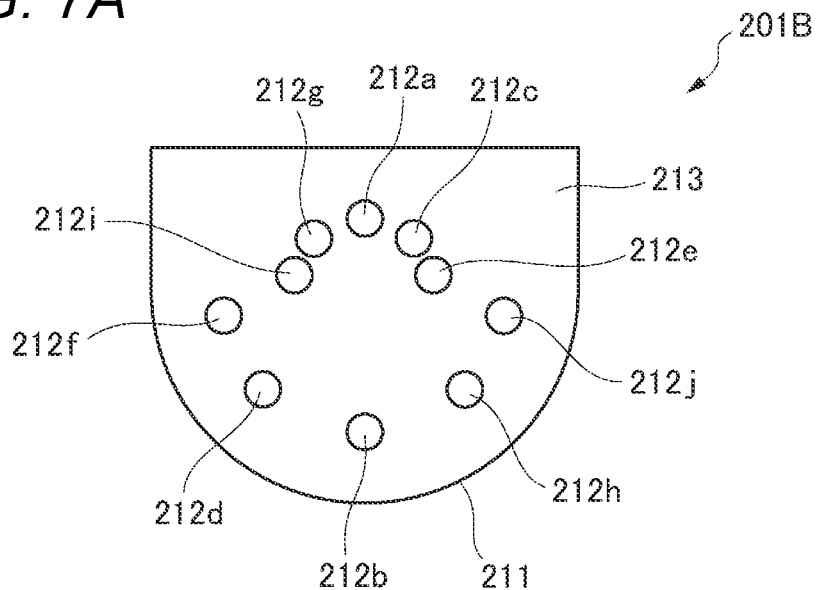
FIGS. 7A and 7B are views for illustrating a configuration of a sensor system according to the second modification of the second embodiment.

FIG. 7A illustrates an appearance of a first sensor unit 201B according to the second modification of the second embodiment as viewed from the top side. Components that are the same as or equivalent to those of the first sensor unit 201 are assigned with the same reference legends, and repetitive descriptions for those will be omitted. In addition to the first recess 212a and the second recess 212b, a third recess 212c, a fourth recess 212d, a fifth recess 212e, a sixth recess 212f, a seventh recess 212g, an eighth recess 212h, a ninth recess 212i, and a tenth recess 212j are formed on the top face 213 of the first sensor unit 201B.

Figure 7B:
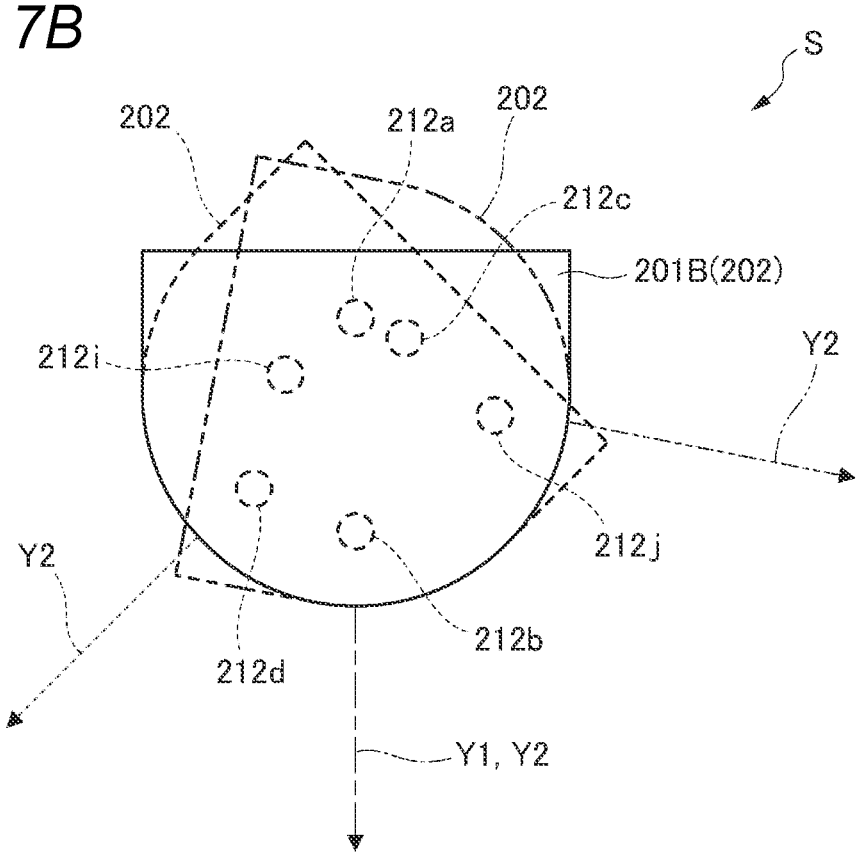

As illustrated in FIG. 7B, in this example, the angles formed by the detecting reference direction Y1 of the first sensor unit 201B and the detecting reference direction Y2 of the second sensor unit 202 in the plane intersecting the coupling direction of the first sensor unit 201B and the second sensor unit 202 can be selected from a plurality of values.

As an example, when the first protrusion 222a and the second protrusion 222b of the second sensor unit 202 are fitted into the first recess 212a and the second recess 212b of the first sensor unit 201B, respectively, the detecting reference direction Y1 of the first sensor unit 201B coincides with the detecting reference direction Y2 of the second sensor unit 202, similarly to the example illustrated in FIG. 5A.

As another example, when the first protrusion 222a and the second protrusion 222b of the second sensor unit 202 are fitted into the third recess 212c and the fourth recess 212d of the first sensor unit 201B, respectively, the detecting reference direction Y2 of the second sensor unit 202 is set to a direction different from the detecting reference direction Y1 of the first sensor unit 201B (indicated by an arrow with dashed lines).

As another example, when the first protrusion 222a and the second protrusion 222b of the second sensor unit 202 are fitted into the ninth recess 212i and the tenth recess 212j of the first sensor unit 201B, respectively, the detecting reference direction Y2 of the second sensor unit 202 is set to a direction different from the detecting reference direction Y1 of the first sensor unit 201B (indicated by an arrow with chain lines).

According to such a configuration, while reducing the workload for adjusting the detecting reference directions, it is also possible to improve the degree of freedom in selecting the detecting reference directions.

In each of the above examples, the first sensor unit 201 (201A, 201B) is provided with recesses, whereas the second sensor unit 202 is provided with protrusions configured to be fitted into the recesses. However, the first sensor unit 201 (201A, 201B) may be provided with protrusions, whereas recesses into which the protrusions are fitted may be provided in the second sensor unit 202.

The positions, the number, and the shapes of the protrusions and the recesses provided in the first sensor unit 201 (201A, 201B) and the second sensor unit 202 may be appropriately determined in accordance with the postures of the first sensor unit 201 (201A, 201B) and the second sensor unit 202 at the time of coupling. For example, each of a groove formed on one of two faces facing each other at the time of coupling and a protrusion provided on the other face and fitted into the groove may also be an example of the regulating member.

Figure 8A:
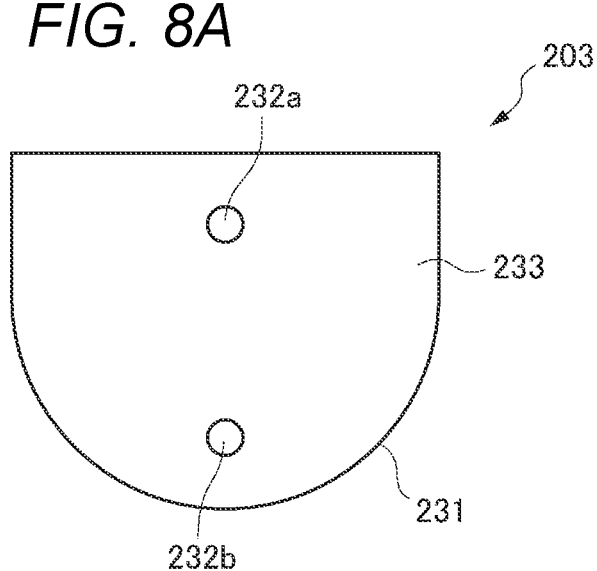
FIGS. 8A to 8D illustrate appearances of a sensor unit according to the third embodiment.
Figure 8B:
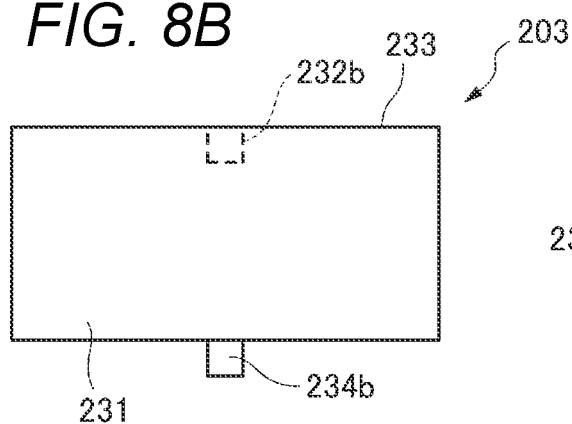
Figure 8D:
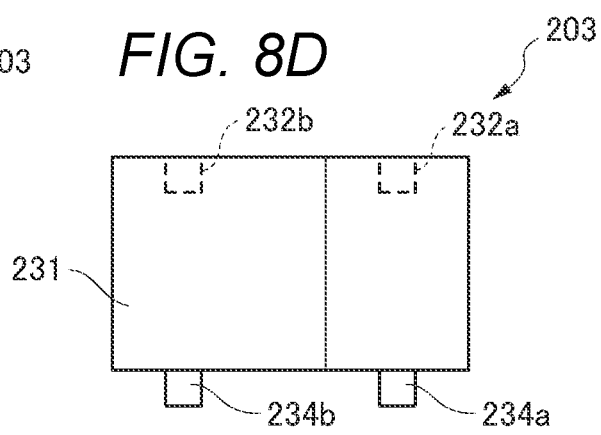
Figure 8C:
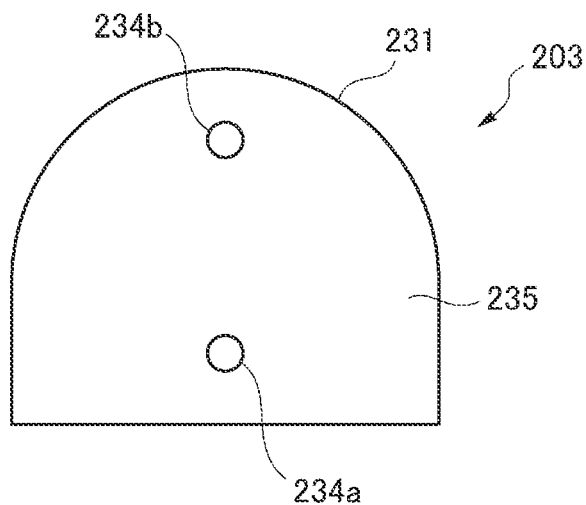

FIG. 8A illustrates an appearance of a sensor unit 203 according to the third embodiment as viewed from the top side. FIG. 8B illustrates the sensor unit 203 as viewed from the front side. FIG. 8C illustrates the sensor unit 203 as viewed from the bottom side. FIG. 8D illustrates the sensor unit 203 as viewed from the right side. The appearance viewed from the left side is symmetrical with the appearance viewed from the right side relative to the left-right direction.

The sensor unit 203 is a device adapted to be mounted on a vehicle for acquiring information in an outside area of the vehicle. For example, the sensor unit 203 may be any of a LiDAR sensor unit, a camera unit, or a millimeter wave sensor unit.

The sensor unit 203 includes a detecting face 231. The detecting face 231 is a portion, through which light relating to detection of information passes, of an outer face forming a housing of the sensor unit 203.

The sensor unit 203 includes a first recess 232a and a second recess 232b. The first recess 232a and the second recess 232b are formed on a top face 233 of the sensor unit 203.

The sensor unit 203 includes a first protrusion 234a and a second protrusion 234b. The first protrusion 234a and the second protrusion 234b are provided on a bottom face 235 of the sensor unit 203.

According to such a configuration, any number of sensor units 203 having the same configuration can be coupled in the up-down direction. Accordingly, it is possible to reduce the manufacturing cost while reducing the workload for adjusting the detecting reference directions.

Figure 9:
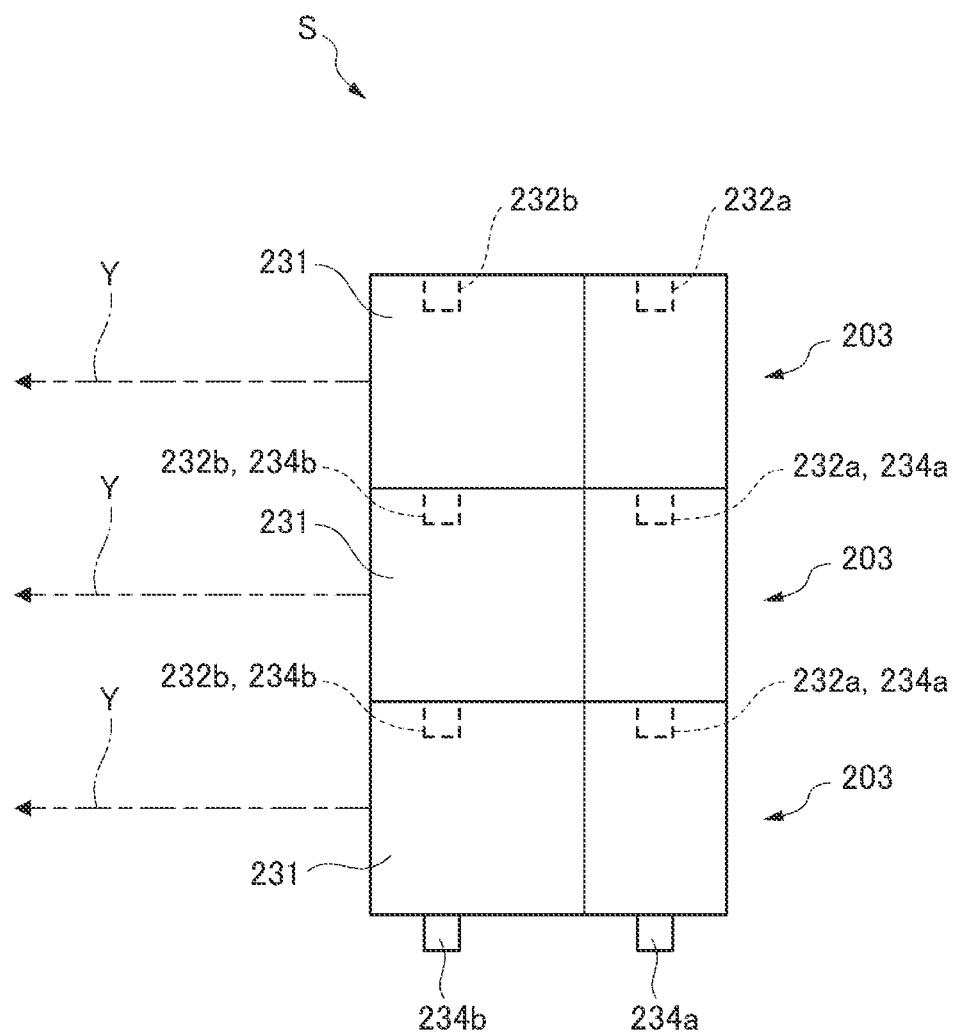
FIG. 9 illustrates a configuration of a sensor system according to the third embodiment.

FIG. 9 illustrates a state in which three sensor units 203 are coupled in the up-down direction. Specifically, the first protrusion 234a and the second protrusion 234b of one sensor unit 203 are fitted into the first recess 232a and the second recess 232b of another sensor unit 203, respectively, so that the two sensor units 203 are coupled in the up-down direction. In this example, the first recess 232a, the second recess 232b, the first protrusion 234a, and the second protrusion 234b are arranged such that a detecting reference direction Y of one sensor unit 203 coincides with a detecting reference direction Y of the other sensor unit 203 in a plane intersecting with the coupling direction.

In this case, one of the two sensor units 203 to be coupled is an example of the first sensor unit and the other sensor unit 203 is an example of the second sensor unit. Each of the first recess 232a, the second recess 232b, the first protrusion 234a, and the second protrusion 234b is an example of the regulating member.

The positions of the first recess 232a, the second recess 232b, the first protrusion 234a, and the second protrusion 234b may be appropriately determined in accordance with the angle formed by the detecting reference directions Y of the two sensor units 203 to be coupled, as in the example illustrated in FIGS. 6A and 6B.

As in the example illustrated in FIGS. 7A to 7D, the number of recesses formed in the top face 233 may be three or more. Thus, the angle between the detecting reference directions Y of two sensor units 203 to be coupled is selectable from a plurality of values.

In this example, the recesses are formed on the top face 233 of the sensor unit 203, whereas the protrusions to be fitted with the recesses of another sensor unit 203 is provided on the bottom face 235. However, the protrusions may be provided on the top face 233, whereas the recesses may be formed on the bottom face 235.

All of the plural sensor units 203 to be coupled need not to be the same type of sensor unit. For example, in the example illustrated in FIG. 9, the upper sensor unit 203, the middle sensor unit 203, and the lower sensor unit 203 may be a LiDAR sensor unit, a camera unit, and a millimeter wave sensor unit, respectively.

FIG. 10A illustrates an appearance of a sensor unit 204 according to the fourth embodiment as viewed from the rear side. FIG. 10B illustrates an appearance of the sensor unit 204 as viewed from the left side. FIG. 10C illustrates an appearance of the sensor unit 204 as viewed from the top side. FIG. 10D illustrates an appearance of the sensor unit 204 as viewed from the right side. FIG. 10E illustrates an appearance of the sensor unit 204 as viewed from the front side. The appearance viewed from the bottom side is symmetrical with the appearance viewed from the top side relative to the left-right direction.

The sensor unit 204 is a device adapted to be mounted on a vehicle for acquiring information in an outside area of the vehicle. For example, the sensor unit 204 may be any of a LiDAR sensor unit, a camera unit, or a millimeter wave sensor unit.

The sensor unit 204 includes a detecting face 241. The detecting face 241 is a portion, through which light relating to detection of information passes, of an outer face forming a housing of the sensor unit 204.

The sensor unit 204 includes a first recess 242*a* and a second recess 242*b*. The first recess 242*a* and the second recess 242*b* are formed on a left side face 243 of the sensor unit 204.

The sensor unit 204 includes a first protrusion 244*a* and a second protrusion 244*b*. The first protrusion 244*a* and the second protrusion 244*b* are provided on a right side face 245 of the sensor unit 204.

According to such a configuration, it is possible to couple any number of sensor units 204 having the same configuration in the left-right direction. Accordingly, it is possible to reduce the manufacturing cost while reducing the workload for adjusting the detecting reference directions.

Figure 11:
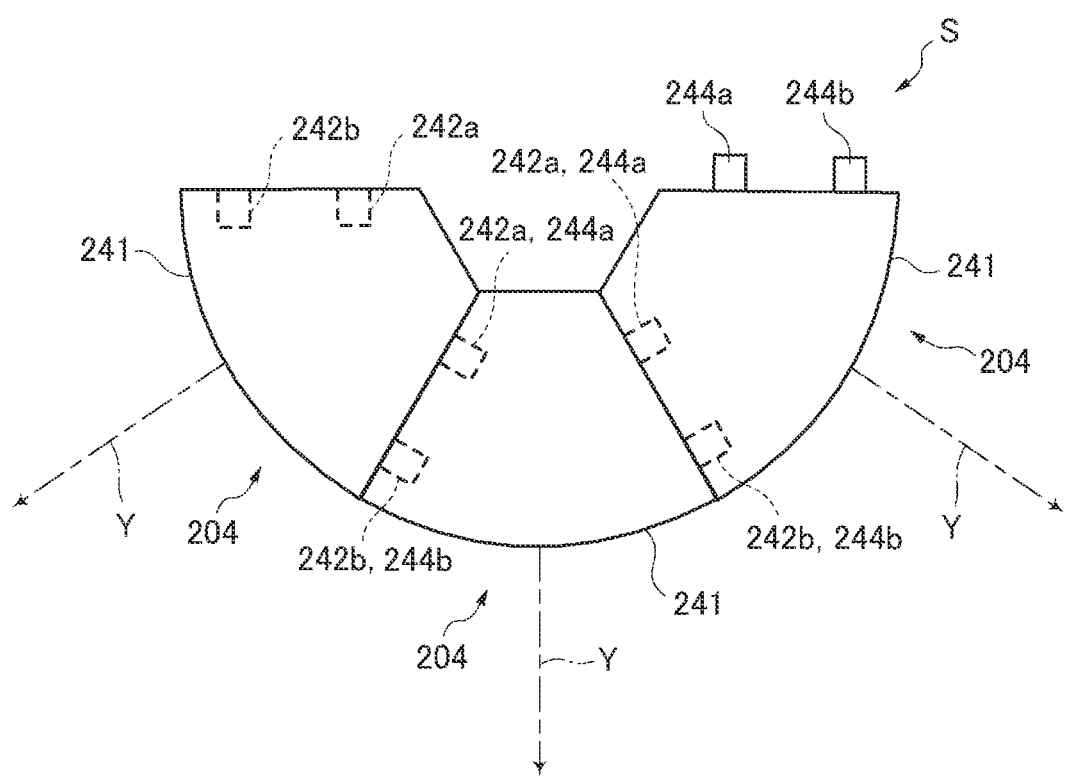
FIG. 11 illustrates a configuration of a sensor system according to the fourth embodiment.

FIG. 11 illustrates a state in which three sensor units 204 are coupled in the left-right direction. Specifically, the first protrusion 244*a* and the second protrusion 244*b* of one sensor unit 204 are fitted into the first recess 242*a* and the second recess 242*b* of another sensor unit 204, respectively, so that the two sensor units 204 are coupled in the left-right direction. In this example, the first recess 242*a*, the second recess 242*b*, the first protrusion 244*a*, and the second protrusion 244*b* are arranged such that a detecting reference direction Y of one sensor unit 204 forms a prescribed angle with a detecting reference direction Y of the other sensor unit 204 in a plane including the coupling direction.

In this case, one of the two sensor units 204 to be coupled is an example of the first sensor unit and the other sensor unit 204 is an example of the second sensor unit. Each of the first recess 242*a*, the second recess 242*b*, the first protrusion 244*a*, and the second protrusion 244*b* is an example of the regulating member.

In this example, the recesses are formed on the left side face 243 of the sensor unit 204, whereas the protrusions to be fitted with the recesses of another sensor unit 203 is provided on the left side face 245. However, the protrusions may be provided on the left side face 243, whereas the recesses may be formed on the right side face 245.

The positions, the number, and the shapes of the protrusions and the recesses provided in the sensor unit 204 may be appropriately determined in accordance with the postures of the two sensor unit 204 at the time of coupling. For example, each of a groove formed on one of two faces facing each other at the time of coupling and a protrusion provided on the other face and fitted into the groove may also be an example of the regulating member.

All of the plural sensor units 204 to be coupled need not to be the same type of sensor unit. For example, in the example illustrated in FIG. 9, the left sensor unit 204, the central sensor unit 204, and the right sensor unit 204 may be a LiDAR sensor unit, a camera unit, and a millimeter wave sensor unit, respectively. When the same type of sensor units 204 are coupled, it is possible to expand the angle range capable of detecting information in the left-right direction.

As in the example described with reference to FIGS. 6A and 6B, by appropriately defining the positions of the protrusions and the recesses, it is also possible to make the detecting reference directions Y of the two sensor units 204 which are coupled different in a plane intersecting the plane including the coupling direction (i.e., in a plane including the up-down direction). As in the example described with reference to FIGS. 7A and 7B, the angle formed by the two detecting reference directions Y in the plane including the up-down direction may be selectable from a plurality of values.

As illustrated in FIG. 5B, the sensor system S may include a support 205 and an adjustment mechanism 206. The support 205 is a common support for supporting the first sensor unit 201 and the second sensor unit 202. The adjustment mechanism 206 is a mechanism for adjusting at least one of the position and posture of the support 205 relative to the vehicle when the sensor system S is mounted on the vehicle. As the adjustment mechanism 206, a well-known aiming screw mechanism or an actuator mechanism can be exemplified.

Prior to shipment of the sensor system S, the angle formed by the detecting reference direction Y1 of the first sensor unit 201 and the detecting reference direction Y2 of the second sensor unit 202 is uniquely determined by the regulating members described above. However, when the sensor system S is mounted on the vehicle, at least one of the detecting reference direction Y1 and the detecting reference direction Y2 may deviate from the desired direction due to tolerances of the vehicle body parts or misalignment of the sensor system S with respect to the vehicle body. Accordingly, after the sensor system S is mounted on the vehicle, readjustment of the detecting reference direction Y1 and the detecting reference direction Y2 is performed. In the above-described configuration, since the first sensor unit 201 and the second sensor unit 202 are supported by the common support 205, the detecting reference direction Y1 and the detecting reference direction Y2 can be collectively adjusted by the adjustment mechanism 206. Accordingly, even in a case where a plurality of sensor units are used for the driving support, it is possible to reduce the workload for adjusting the detecting reference direction of each sensor unit.

The configuration related to the support 205 and the adjustment mechanism 206 is also applicable to each example of the sensor system S described with reference to other drawings.

Figure 12:
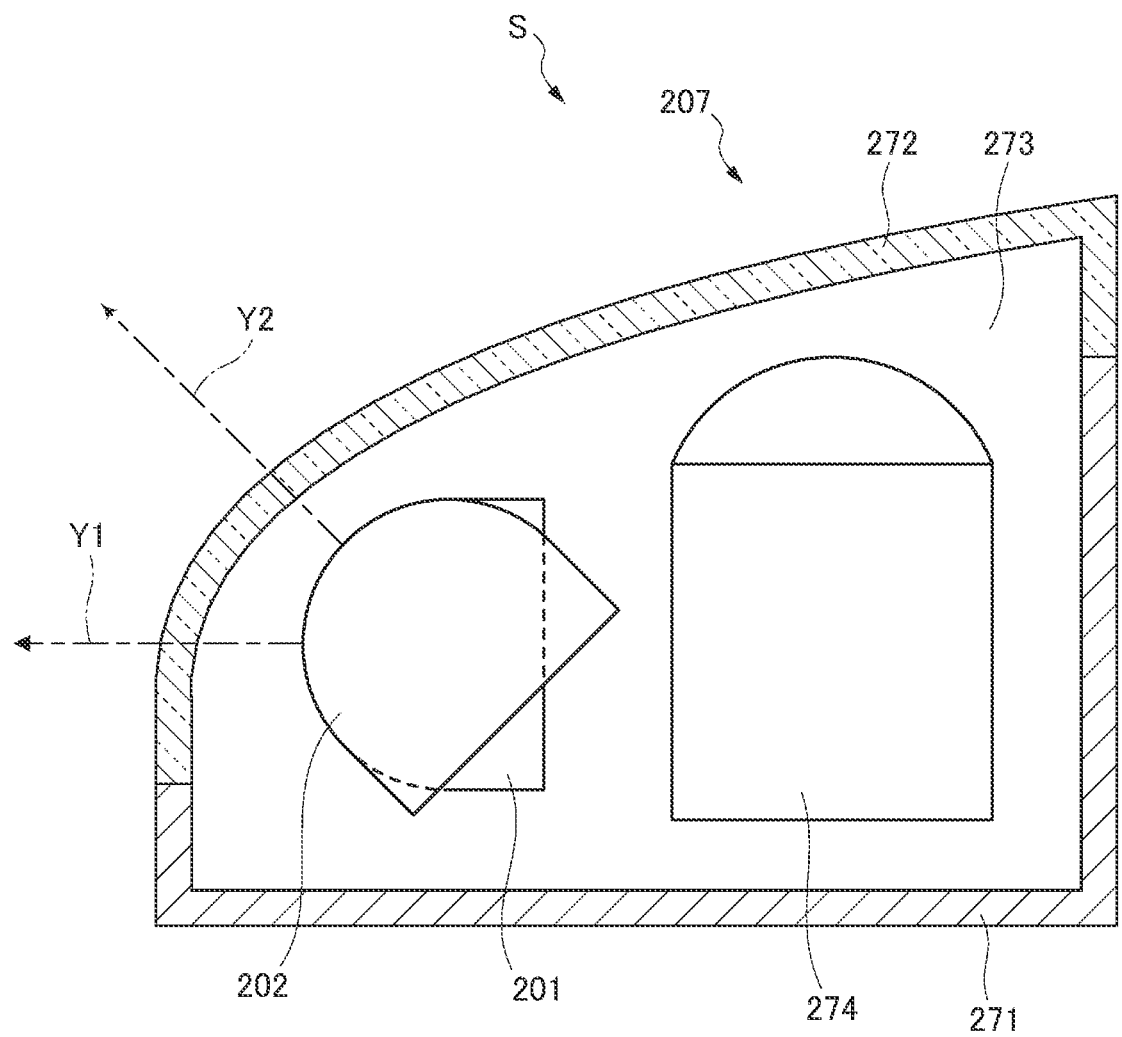
FIG. 12 illustrates a configuration in which the first sensor unit and the second sensor unit are disposed in a lamp chamber.
Figure 12:
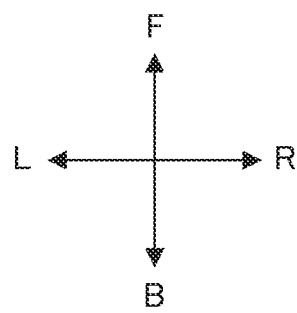

As illustrated in FIG. 12, the sensor system S may include a left front lamp device 207. The left front lamp device 207 may include a lamp housing 271 and a translucent cover 272. The lamp housing 271 defines a lamp chamber 273 together with the translucent cover 272. The left front lamp device 207 is mounted on the left front corner portion LF of the vehicle 100 illustrated in FIG. 2.

In FIG. 12, an arrow F represents a forward direction of the vehicle 100. An arrow B represents a rearward direction of the vehicle 100. An arrow L represents a leftward direction of the vehicle 100. An arrow R represents a rightward direction of the vehicle 100. The terms "left" and "right" used in the descriptions related to this drawing represent the left-right directions as viewed from the driver's seat.

As illustrated in FIG. 12, the left front lamp device 207 may include a lamp unit 274. The lamp unit 274 is a device for emitting visible light to the outside of the vehicle 100. The lamp unit 274 is accommodated in the lamp chamber 273. Examples of the lamp unit 274 include a headlamp unit, a clearance lamp unit, a direction indicator lamp unit, and a fog lamp unit.

As illustrated in FIG. 12, the first sensor unit 201 and the second sensor unit 202 are disposed in the lamp chamber 273. Because of the function of supplying light to the outside of the vehicle 100, the lamp unit 274 is generally disposed in a place with few shields, such as the left front corner portion LF described above. By disposing also first sensor unit 201 and the second sensor unit 202 in such a place, it is possible to efficiently obtain information in an outside area of the vehicle 100.

Accordingly, on the right front corner portion RF of the vehicle 100 illustrated in FIG. 2, a right front lamp device having a configuration symmetrical with the left front lamp device 207 relative to the left-right direction may be mounted. A left rear lamp device may be mounted on the left rear corner portion LB of the vehicle 100. In this case, as the lamp unit provided in the left rear lamp device, a brake lamp unit, a tail lamp unit, a clearance lamp unit, a back lamp unit, or the like may be exemplified. On the right rear corner portion RB of the vehicle 100, a right rear lamp device having a configuration symmetrical with the left rear lamp device relative to the left-right direction may be mounted. In either lamp device, the first sensor unit 201 and the second sensor unit 202 may be disposed in a lamp chamber that is defined by a lamp housing.

The second to fourth embodiments are mere examples for facilitating understanding of the gist of the presently disclosed subject matter. The configuration according to each embodiment described above can be appropriately modified without departing from the gist of the presently disclosed subject matter.

Another examples of the embodiment will be described in detail below with reference to FIGS. 13A to 18. In each of the drawings, the scale is appropriately changed in order to make each of the members have a recognizable size.

In each drawing, an arrow F represents a forward direction of the illustrated structure. An arrow B represents a rearward direction of the illustrated structure. An arrow U represents an upward direction of the illustrated structure. An arrow D represents a downward direction of the illustrated structure. An arrow L represents a leftward direction of the illustrated structure. An arrow R represents a rightward direction of the illustrated structure. These directions are merely used for convenience of explanation, and are not intended to limit the posture in actual use.

Figure 13A:
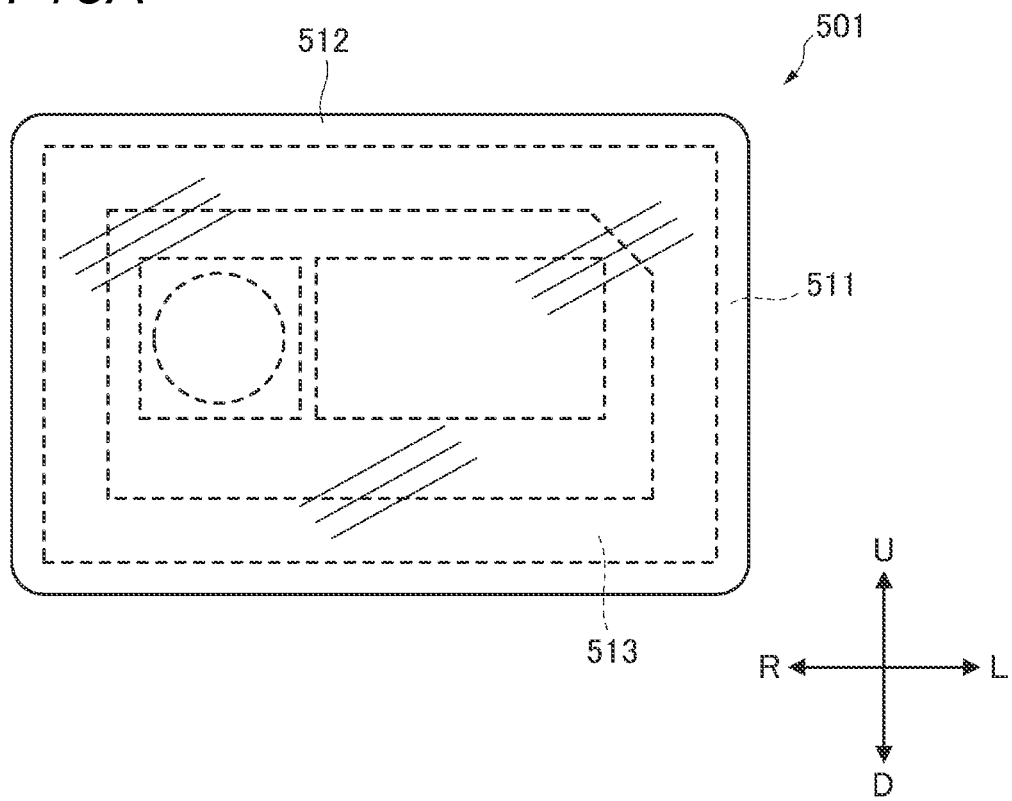
FIGS. 13A and 13B illustrate appearances of a sensor module according to the fifth embodiment.

FIG. 13A illustrates an appearance of a sensor module 501 according to the fifth embodiment. The sensor module 501 includes a housing 511 and a translucent cover 512. The housing 511 defines an accommodation chamber 513 together with the translucent cover 512.

Figure 13B:
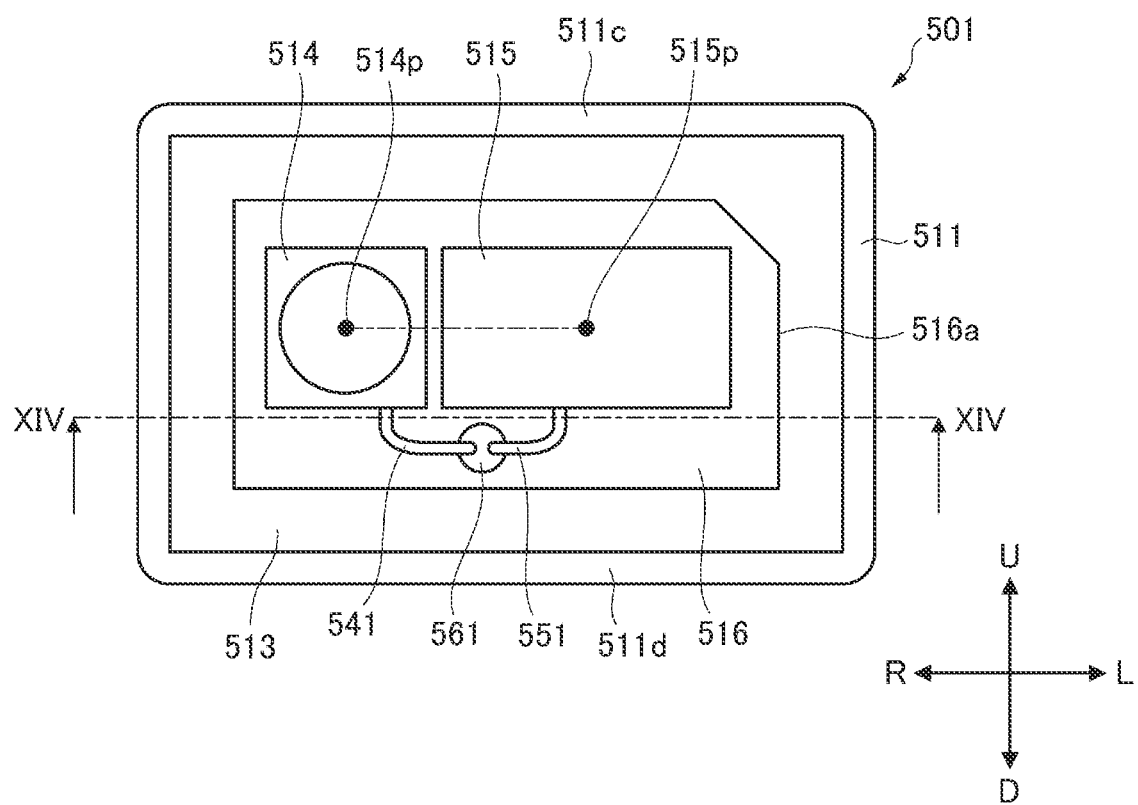
Figure 14:
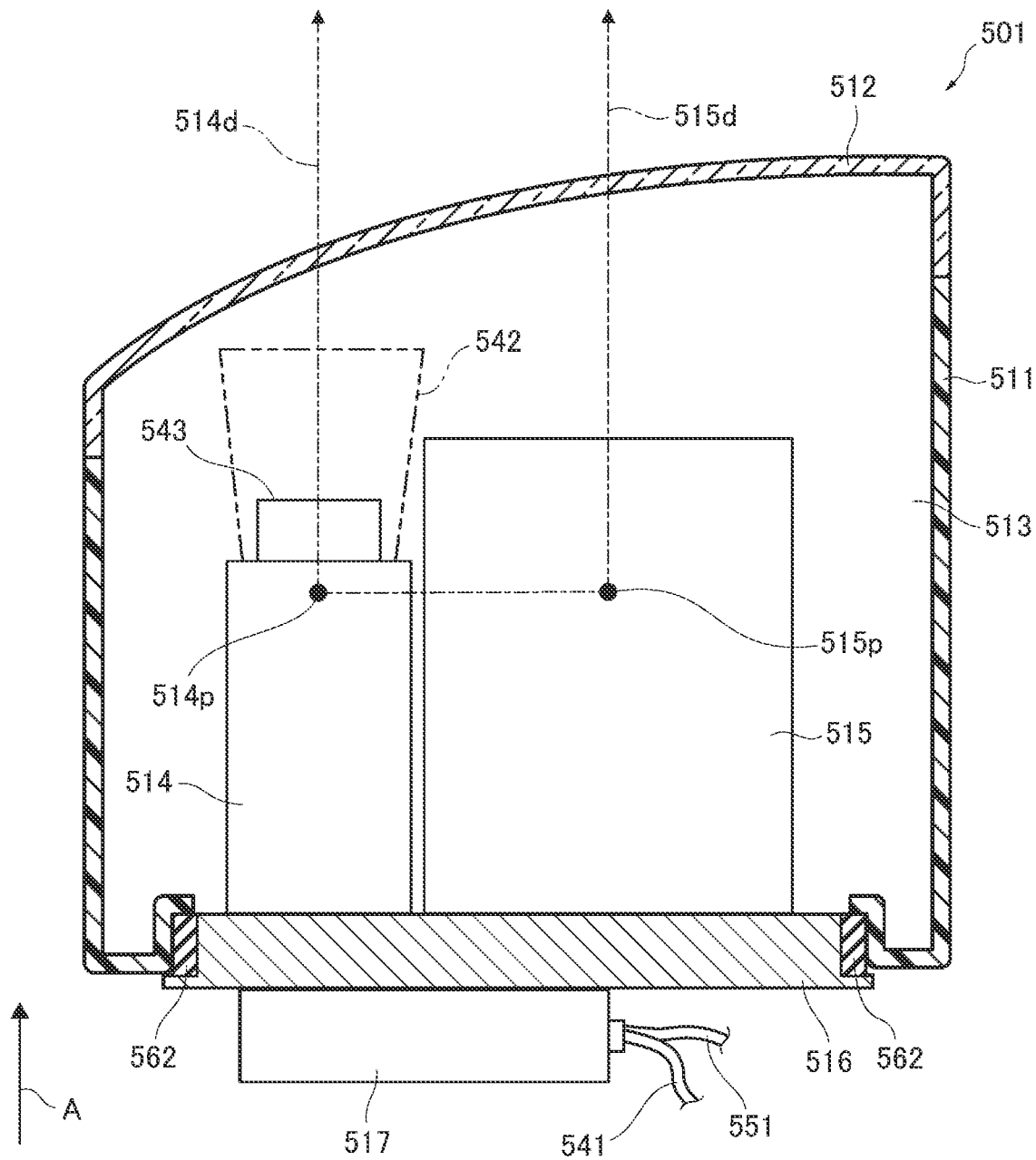
FIG. 14 illustrates an internal configuration of the sensor module of FIGS. 13A and 13B.
Figure 14:
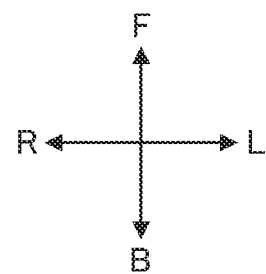

FIG. 13B illustrates an appearance of the sensor module 501 in a state where the translucent cover 512 is removed. FIG. 14 illustrates a cross section of the sensor module 501 along the line XIV-XIV in FIG. 13B and viewed from the direction of the arrows.

The sensor module 501 includes a camera unit 514 and a LiDAR sensor unit 515. The camera unit 514 is an example of the first sensor unit. The LiDAR sensor unit 515 is an example of the second sensor unit.

The camera unit 514 is a device for acquiring an image as information in an outside area of the vehicle. The image may include at least one of a still image and a video image. The camera unit 514 may include a camera sensitive to visible light or a camera sensitive to infrared light.

The LiDAR sensor unit 515 has a configuration for emitting non-visible light and a configuration for detecting returned light as a result of the non-visible light being reflected by an object existing in at least the outside area of the vehicle. As required, the LiDAR sensor unit 515 may include a scan device that sweeps the non-visible light to change the light emitting direction (i.e., the detecting direction). For example, infrared light having a wavelength of 905 nm is used as the non-visible light.

The sensor module 501 is mounted at an appropriate location in a vehicle. The location so determined as a location at which the camera unit 514 and the LiDAR sensor unit 515 can respectively acquire desired data.

Figure 15:
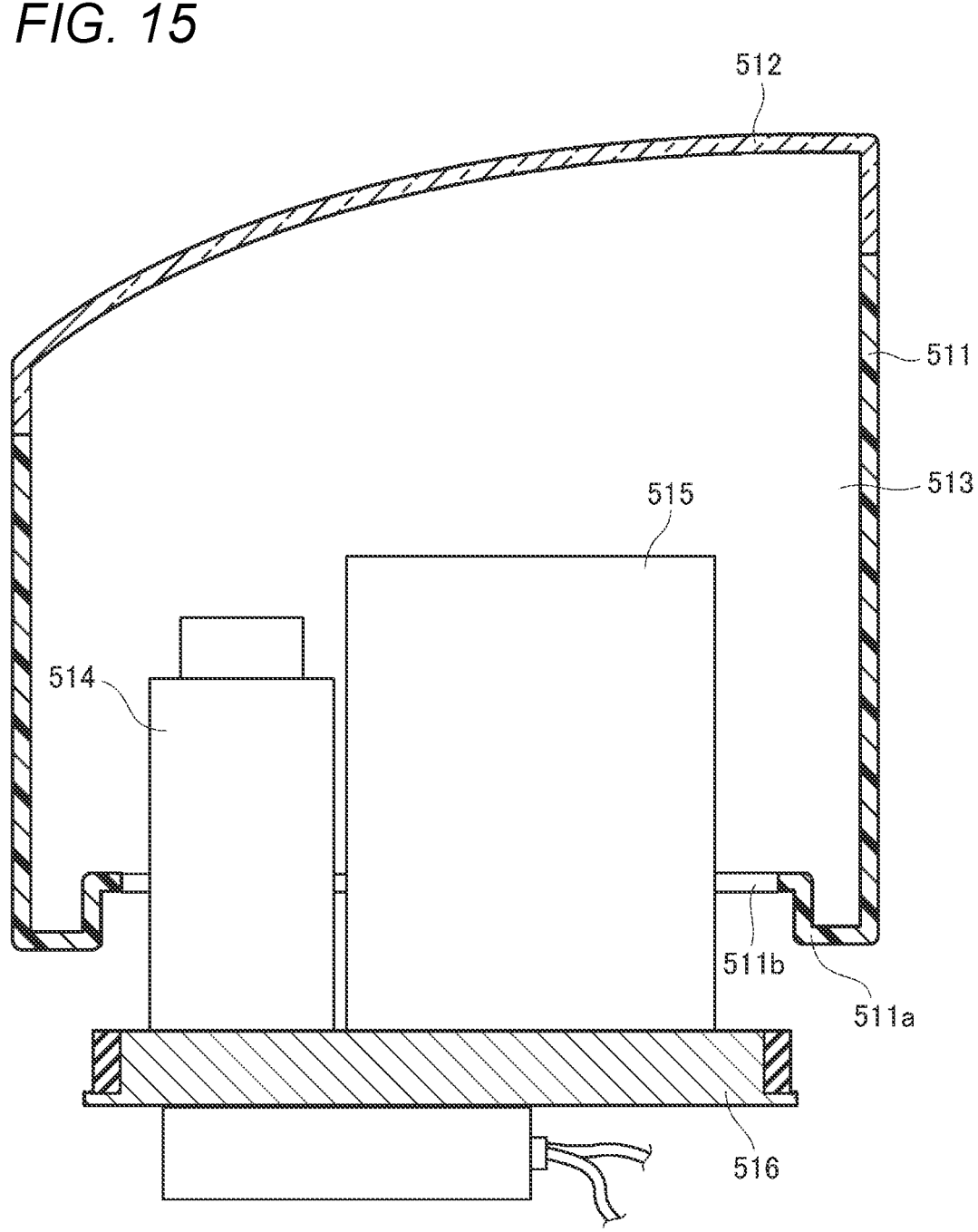
FIG. 15 illustrates an internal configuration of the sensor module of FIGS. 13A and 13B.
Figure 15:
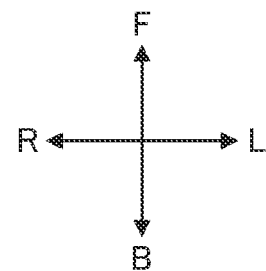

The sensor module 501 includes a support 516. The support 516 supports the camera unit 514 and the LiDAR sensor unit 515. As illustrated in FIG. 15, an opening 511$b$ is formed in a back wall 511$a$ of the housing 511. The support 516 is detachably attached to the housing 511 from the outside.

Specifically, the state illustrated in FIG. 14 is obtained by causing the camera unit 514 and the LiDAR sensor unit 515 supported by the support 516 to pass through the opening 511$b$ and fixing the support 516 to the back wall 511$a$. The arrow A in FIG. 14 represents the attaching direction of the support 516. When the support 516 is attached to the housing 511 in this manner, the support 516 defines a part of the accommodation chamber 513. The camera unit 514 and the LiDAR sensor unit 515 are disposed in the accommodation chamber 513.

According to this configuration, the maintenance and inspection work or the replacement work of the plural sensors can be performed only by attaching and detaching the support 516 with respect to the housing 511 from the outside of the housing 511. Accordingly, it is possible to reduce the labor required for maintenance and inspection works or the replacement works of a plurality of sensors mounted on the vehicle.

As illustrated in FIG. 13B, when viewed from the attaching direction of the support 516, the camera unit 514 and the LiDAR sensor unit 515 are entirely located inside an outer edge 516$a$ of the support 516.

According to such a configuration, it is possible to eliminate additional effort such as tilting the support 516 when the camera unit 514 and the LiDAR sensor unit 515 are caused to pass through the opening 511$b$ of the housing 511. Since the attachment and detachment of the support 516 with respect to the housing 511 can be performed with a linear operation, it is possible to suppress degradation in work efficiency.

As illustrated in FIG. 13B, when viewed from the attaching direction of the support 516, only one of the four corners of the support 516 has a different shape. The opening 511b formed in the housing 511 also has a shape corresponding to the support 516. In other words, the support 516 and the housing 511 have a shape that regulates a posture when the support 516 is attached to the housing 511.

According to such a configuration, it is possible to avoid a situation in which the camera unit 514 and the LiDAR sensor unit 515 are disposed in the accommodation chamber 513 in a wrong posture (inverse posture in the up-down or left-right direction). In addition, since the posture of the support 516 at the time of attachment to the housing 511 can be determined without hesitation, it is possible to suppress degradation in the work efficiency.

In FIG. 14, an arrow 514d represents a detecting reference direction of the camera unit 514. An arrow 515d represents a detecting reference direction of the LiDAR sensor unit 515. As described above, the posture of the support 516 at the time of attachment to the housing 511 is regulated, whereby the detecting reference direction 514d of the camera unit 514 and the detecting reference direction 515d of the LiDAR sensor unit 515 are easily determined. This also makes it possible to suppress degradation in the work efficiency.

As illustrated in FIG. 14, the attaching direction A of the support 516 is along a detecting reference direction 514d of the camera unit 514 and a detecting reference direction 515d of the LiDAR sensor unit 515.

The expression "along a detecting reference direction" is meant to include a case where the attaching direction A matches the detecting reference direction and a case where the attaching direction A is inclined with respect to the detecting reference direction. However, in the latter case, the inclination with respect to the detecting reference direction of the attaching direction A must be smaller than an inclination with respect to the direction perpendicular to the detecting reference direction. In the embodiment illustrated in FIG. 14, the detecting reference direction 514d of the camera unit 514 and the detecting reference direction 515d of the LiDAR sensor unit 515 are along the front-rear direction. The attaching direction A may be inclined with respect to the front-rear direction. However, the inclination with respect to the front-rear direction must be smaller than the inclination with respect to each of the left-right direction and the up-down direction.

As can be seen from the comparison of FIGS. 13B and 14, the projected area of each sensor unit tends to be small when viewed from the detecting reference direction. Accordingly, by aligning the attaching direction A of the support 516 along the detecting reference direction of each sensor unit, it is possible to reduce the dimensions of the support 516 and the area of the opening 511b of the housing 511.

In FIG. 14, a point 514p represents a detecting reference position of the camera unit 514. A point 515p represents a detecting reference position of the LiDAR sensor unit 515. The detecting reference position may be defined as a physical position related to the actual detection with each sensor unit (such as an image pickup device in the camera unit 514 and the light receiving face of the light receiving element in the LiDAR sensor unit 515), or may be defined as a hypothetical point to be used in the determination of the arrangement or detecting angle of each sensor unit.

In the present embodiment, the detecting reference position 514p of the camera unit 514 and the detecting reference position 515p of the LiDAR sensor unit 515 are not offset in the front-rear direction.

According to such a configuration, collective adjustment of the detecting reference direction 514d of the camera unit 514 and the detecting reference direction 515d of the LiDAR sensor unit 515 by adjusting the posture of the support 516 is facilitated.

As illustrated in FIG. 13B, the detecting reference position 514p of the camera unit 514 and the detecting reference position 515p of the LiDAR sensor unit 515 are not offset in the up-down direction.

Even with such a configuration, collective adjustment of the detecting reference direction 514d of the camera unit 514 and the detecting reference direction 515d of the LiDAR sensor unit 515 by adjusting the posture of the support 516 is facilitated.

That is, the support 516 may include a mechanism (not illustrated) for finely adjusting the own posture with respect to the housing 511. As such a mechanism, an aiming screw mechanism or an actuator mechanism can be exemplified.

The camera unit 514 and the LiDAR sensor unit 515 may be individually detachable from the support 516.

According to such a configuration, since the sensor unit that does not require repair or replacement can be continuously used, it is possible to economically operate the sensor module 501.

As illustrated in FIG. 13B, a signal line 541 is connected to the camera unit 514. The signal line 541 is used to provide power and/or a control signal to the camera unit 514, and/or to output a signal corresponding to information detected by the camera unit 514.

Similarly, a signal line 551 is connected to the LiDAR sensor unit 515. The signal line 551 is used to provide power and/or a control signal to the LiDAR sensor unit 515, and/or to output a signal corresponding to the information detected by the LiDAR sensor unit 515.

The sensor module 501 includes a gathering member 561. The gathering member 561 is provided on the support 516 The gathering unit 561 gathers the signal line 541 connected to the camera unit 514 and the signal line 551 connected to the LiDAR sensor unit 515. The gathering member 561 is provided, for example, as an elastic member in which through holes are formed. A through hole is formed in the housing 511, so that the gathering member 561 is fitted into the through hole. The signal line 541 and the signal line 551 are drawn to the outside of the housing 511 through the through holes formed in the gathering member 561.

In a case where the sensor module includes a plurality of sensor units, it is necessary to route a plurality of signal lines. According to the configuration as described above, since the plural signal lines are gathered in the support 516, the handling of the plural signal lines is facilitated. Accordingly, it is possible to suppress degradation in the work efficiency.

As illustrated in FIG. 14, the sensor module 501 includes a control device 517. The control device 517 is a device for controlling each of the camera unit 514 and the LiDAR sensor unit 515. In this example, the control device 517 is supported on the support 516 outside the housing 511. The signal line 541 and signal line 551 are connected to the control device 517. The signal for controlling the operation of the camera unit 514 is supplied to the camera unit 514 by way of the signal line 541. The signal for controlling the operation of the LiDAR sensor unit 515 is supplied to the LiDAR sensor unit 515 by way of the signal line 551.

Although not illustrated, a communication line is connected to the control device 517. The communication line is directly or indirectly connected to an integration control device such as an ECU mounted on the vehicle. This enables communication of signals and data between the control device 517 and the integration control device.

The control device 517 may be implemented by a general-purpose microprocessor operating in conjunction with a general-purpose memory. Examples of the general-purpose microprocessor include a CPU, an MPU, and a GPU. Examples of the general-purpose memory include a RAM and a ROM. In this case, a computer program for implementing the processing described later may be stored in the ROM. The general-purpose microprocessor specifies at least a portion of the program stored in the ROM, load the program on the RAM, and execute the processing in cooperation with the RAM. The control device 517 may be implemented by a microcontroller, an ASIC, an FPGA, or other dedicated integrated circuits capable of executing a computer program for implementing the processes described later. The control device 517 may be implemented by a combination of the general-purpose microprocessor and the dedicated integrated circuit.

According to such a configuration, the processing that shall be executed by the integration control device such as an ECU mounted on the vehicle can be partially shared by the control device 517. Accordingly, the processing load on the integration control device can be reduced.

It should be noted that either one of the operation of the camera unit 514 and the operation of the LiDAR sensor unit 515 may be controlled by the integration control device described above without involving the control device 517.

The control device 517 may be supported by the support 516 in the accommodation chamber 513. In this case, the signal line 541 and the signal line 551 are connected to the control device 517 in the accommodation chamber 513, so that the control device 517 may serve as the gathering member. The signal line used for communication with the integration control device is drawn from the accommodation chamber 513 to the outside of the housing 511.

As illustrated in FIG. 14, the support 516 is formed of a material containing metal.

According to such a configuration, it is possible to efficiently dissipate heat generated by the operation of each of the camera unit 514 and the LiDAR sensor unit 515. In the case where the control device 517 is supported by the support 516, heat generated by the operation of the control device 517 can also be efficiently dissipated.

As illustrated in FIG. 14, the support 516 includes a sealing member 562. The sealing member 562 is disposed between the support 516 and the housing 511. Examples of the sealing member 562 include a gasket and O-ring. The sealing member 562 may have elasticity.

According to such a configuration, even if the support 516 defining a part of the accommodation chamber 513 is made detachable from the outside of the housing 511, it is possible to secure water resistance and dust resistance of the accommodation chamber 513.

As illustrated in FIG. 14, the camera unit 514 may include a shading cover 542. The shading cover 542 is provided so as to surround an image pickup face 543 of the camera unit 514.

According to such a configuration, it is possible to suppress the incidence of disturbance light on the image pickup face 543. Accordingly, it is possible to suppress a decrease in the detection accuracy of the information in an outside area of the vehicle by the camera unit 514.

The fifth embodiment is a mere example for facilitating understanding of the gist of the presently disclosed subject matter. The configuration according to the fifth embodiment can be appropriately modified without departing from the gist of the presently disclosed subject matter.

In the fifth embodiment, the attaching direction A of the support 516 with respect to the housing 511 is along the detecting reference direction 514d of the camera unit 514 and the detecting reference direction 515d of the LiDAR sensor unit 515. However, the attaching direction of the support 516 may not be along the detecting reference direction 514d of the camera unit 514 and the detecting reference direction 515d of the LiDAR sensor unit 515.

Figure 16:
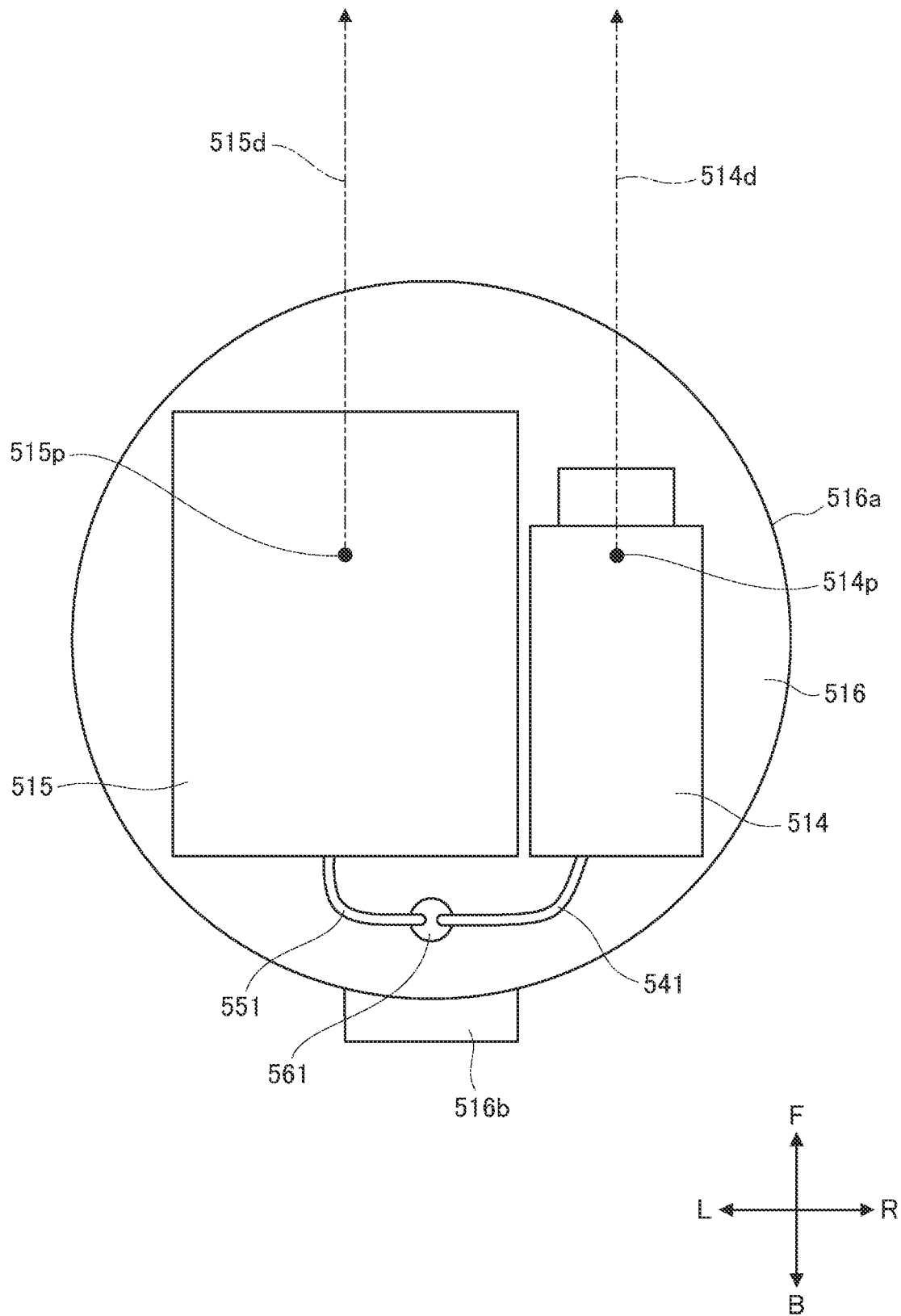
FIG. 16 illustrates an alternative configuration of the sensor module of FIGS. 13A and 13B.

FIG. 16 illustrates such another example. In this example, the attaching direction of the support 516 is along the up-down direction of the sensor module 501. On the other hand, the detecting reference direction 514d of the camera unit 514 and the detecting reference direction 515d of the LiDAR sensor unit 515 are along the front-rear direction of the sensor module 501. Specifically, the opening 511b described above is formed in a ceiling wall 511c or a bottom wall 511d of the housing 511 illustrated in FIG. 13B, so that the support 516 is attached to the housing 511 by causing the camera unit 514 and the LiDAR sensor unit 515 to pass through such an opening 511b.

Also in this embodiment, when viewed from the attaching direction of the support 516, the camera unit 514 and the LiDAR sensor unit 515 are entirely located inside the outer edge 516a of the support 516.

In the fifth embodiment, the support 516 as viewed from the attaching direction with respect to the housing 511 has a substantially rectangular shape in which only one of the four corners has a different shape. However, as illustrated in FIG. 16, the shape of the support 516 as viewed from the attaching direction may have a substantially circular shape. In this case, a protrusion 516b may be formed on a part of the outer edge 516a. On the other hand, the opening 511b formed in the housing 511, a notch for receiving the protrusion 516b is formed. Namely, also in this example, the support 516 and the housing 511 have a shape that regulates the posture when the support 516 is attached to the housing 511. The relationship between the protrusion and the notch may be reversed.

In the fifth embodiment, the detecting reference direction 514d of the camera unit 514 and the detecting reference direction 515d of the LiDAR sensor unit 515 do not relatively change. In other words, the detecting reference direction 514d and the detecting reference direction 515d are fixed or collectively adjusted together with the support 516. However, configurations the detecting reference direction 514d and the detecting reference direction 515d may be individually adjustable.

Figure 17A:
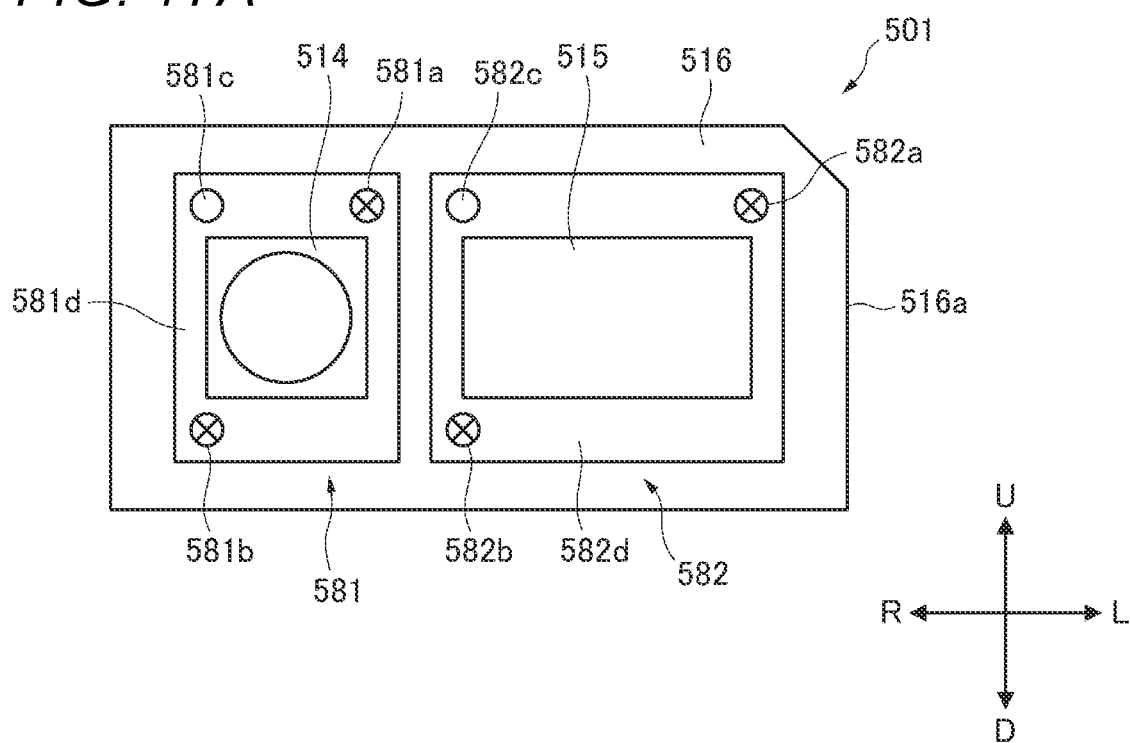
FIGS. 17A and 17B illustrate alternative configurations of the sensor module of FIGS. 13A and 13B.

FIG. 17A illustrates such an example. In this example, the sensor module 501 includes a first adjustment mechanism 581 and a second adjustment mechanism 582. The first adjustment mechanism 581 is a mechanism for adjusting the detecting reference direction 514d of the camera unit 514. The second adjustment mechanism 582 is a mechanism for adjusting the detecting reference direction 515d of the LiDAR sensor unit 515. The first adjustment mechanism 581 and the second adjustment mechanism 582 are supported by the support 516.

Specifically, the first adjustment mechanism 581 is an aiming screw mechanism including a screw 581a, a screw 581b, a fulcrum 581c, and a supporting plate 581d. The camera unit 514 is supported by the supporting plate 581d. The supporting plate 581d is supported by the support 516 by way of the screw 581a, the screw 581b, and the fulcrum 581c. The screw 581a and the screw 581b can be operated from the outside of the housing 511.

When the screw 581a is operated, the posture of the supporting plate 581d changes in the left-right direction about the fulcrum 581c. As a result, the detecting reference direction 514d of the camera unit 514 changes in the left-right direction. When the screw 581b is operated, the posture of the supporting plate 581d changes in the up-down direction about the fulcrum 581c. As a result, the detecting reference direction 514d of the camera unit 514 changes in the up-down direction. Each of the screw 581a and the screw 581b can be replaced with an actuator operated by an external control signal.

Similarly, the second adjustment mechanism 582 is an aiming screw mechanism including a screw 582a, a screw 582b, a fulcrum 582c, and a supporting plate 582d. The LiDAR sensor unit 515 is supported by the supporting plate 582d. The supporting plate 582d is supported by the support 516 by way of the screw 582a, the screw 582b, and the fulcrum 582c. The screw 582a and the screw 582b can be operated from the outside of the housing 511.

When the screw 582a is operated, the posture of the supporting plate 582d changes in the left-right direction about the fulcrum 582c. As a result, the detecting reference direction 515d of the LiDAR sensor unit 515 changes in the left-right direction. When the screw 582b is operated, the posture of the supporting plate 582d changes in the up-down direction about the fulcrum 582c. As a result, the detecting reference direction 515d of the LiDAR sensor unit 515 changes in the up-down direction. Each of the screw 582a and the screw 582b can be replaced with an actuator operated by an external control signal.

According to such a configuration, adjustment of the detecting reference direction of a particular sensor unit can be performed without being constrained by the detecting reference direction of another sensor unit.

In the fifth embodiment, the sensor module 501 includes two sensor units. However, the number of sensor units included in the sensor module 501 may be three or more.

Figure 17B:
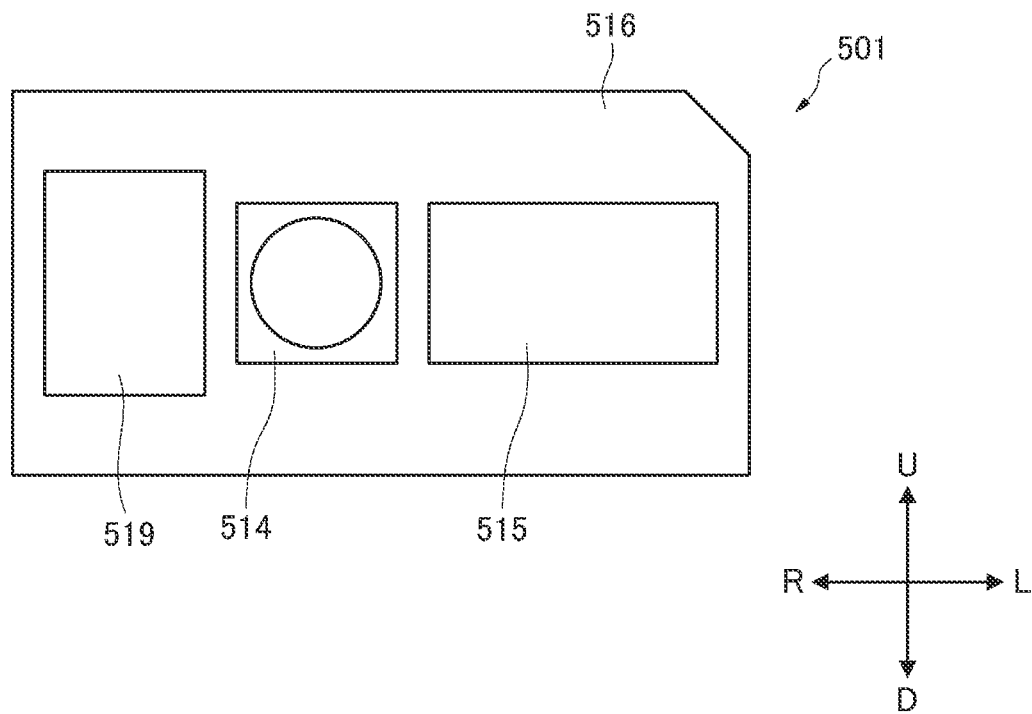

FIG. 17B illustrates such another example. The sensor module 501 may further include a millimeter wave sensor unit 519. The millimeter wave sensor unit 519 is supported by the support 516. The millimeter wave sensor unit 519 is an example of the third sensor unit.

The millimeter wave sensor unit 519 has a configuration for transmitting a millimeter wave and a configuration for receiving a reflected wave as a result of the millimeter wave being reflected by an object existing in an outside area of the vehicle. Examples of frequencies of millimeter waves include 24 GHz, 26 GHz, 76 GHz, and 79 GHz.

According to such a configuration, while increasing the information of the acquired vehicle outside, it is possible to reduce the labor required for the maintenance and inspection works or the replacement works of the sensor.

In each of the examples described so far, the types of the plural sensor units provided in the sensor module 501 are different. However, the sensor units may be suitably selected from the camera unit the LiDAR sensor unit, and the millimeter wave sensor unit described above.

In the fifth embodiment, the sensor module 501 includes a plurality of sensor units. However, the sensor module 501 may be configured so as to include a lamp unit and at least one sensor unit.

Figure 18:
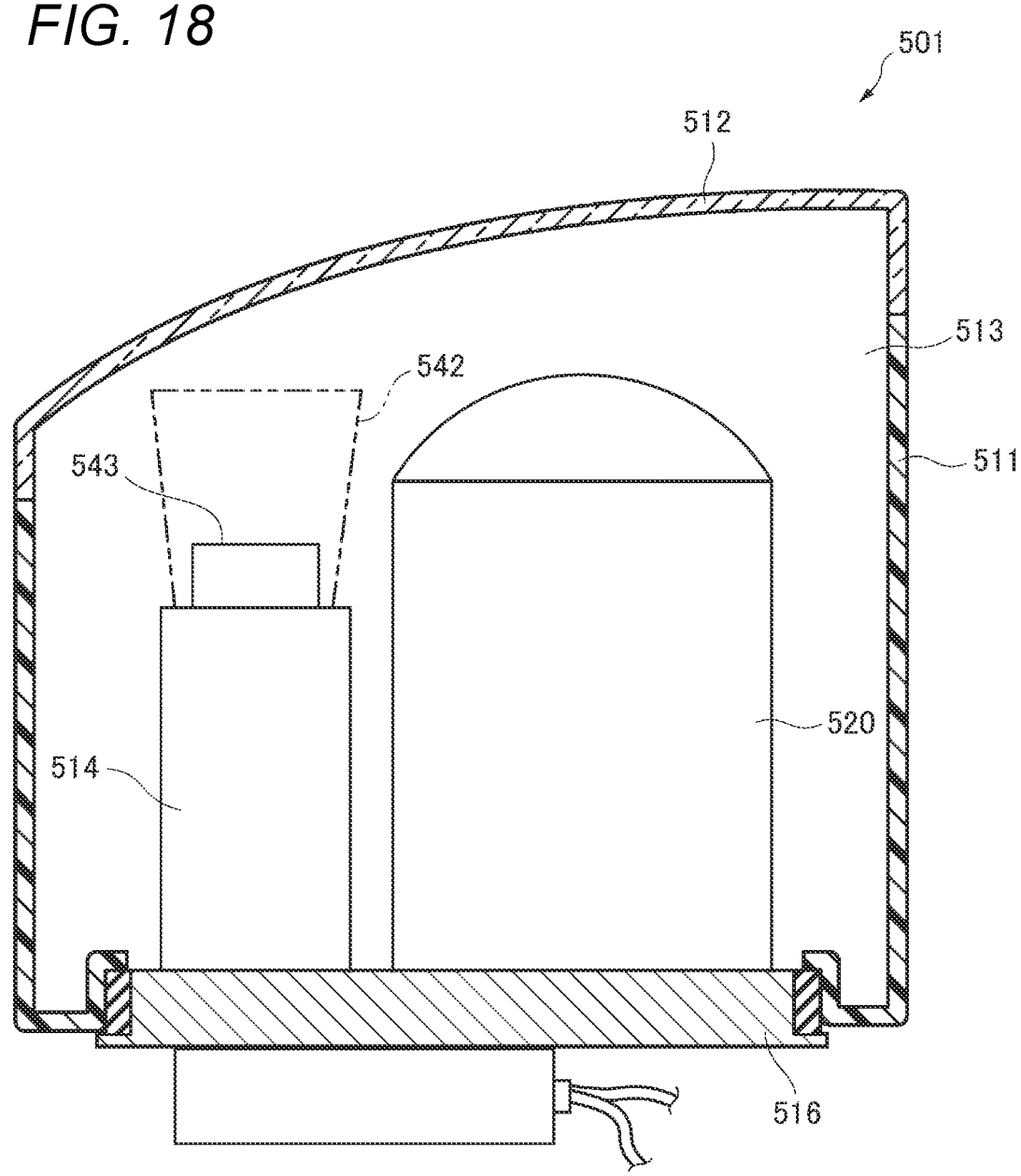
FIG. 18 illustrates an alternative configuration of the sensor module of FIGS. 13A and 13B.
Figure 18:
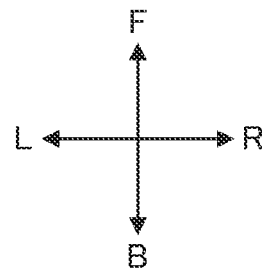

FIG. 18 illustrates such another example. The sensor module 501 includes the camera unit 514 and a lamp unit 520. The lamp unit 520 is a device for emitting visible light to the outside of the vehicle 100. The lamp unit 520 is accommodated in the accommodation chamber 513. The lamp unit 520 is supported by the support 516. Examples of the lamp unit 520 include a headlamp unit, a clearance lamp unit, a direction indicator lamp unit, and a fog lamp unit.

In this case, the sensor module 501 is mounted on the left front corner portion LF of the vehicle 100 illustrated in FIG. 2. On the right front corner portion RF of the vehicle 100, the sensor module having a configuration symmetrical with the sensor module 501 illustrated in FIG. 18 relative to the left-right direction is mounted. The terms "left" and "right" used in the descriptions with reference to FIG. 18 represent the left-right directions as viewed from the driver's seat.

The sensor module 501 illustrated in FIG. 18 may also be mounted in the left rear corner portion LB of the vehicle 100 illustrated in FIG. 2. The basic configuration of the sensor module mounted on the left rear corner portion LB may be symmetrical with the sensor module 501 illustrated in FIG. 18 relative to the front-rear direction.

The sensor module 501 illustrated in FIG. 18 may also be mounted in the right rear corner portion RB of the vehicle 100 illustrated in FIG. 2. The basic configuration of the sensor module mounted on the right rear corner portion RB is symmetrical with the sensor module mounted on the left rear corner portion LB described above relative to the left-right direction.

According to such a configuration, the maintenance and inspection works or the replacement works of the camera unit 514 and the lamp unit 520 can be performed by merely attaching and detaching the support 516 with respect to the housing 511 from the outside of the housing 511. Accordingly, it is possible to reduce the labor required for the maintenance and inspection works or the replacement works of the sensor module in which at least one sensor unit and the lamp unit are disposed in the accommodation chamber 513.

Another examples of the embodiment will be described in detail below with reference to FIGS. 19 to 26. In each of the drawings, the scale is appropriately changed in order to make each of the members have a recognizable size.

In each drawing, an arrow F represents a forward direction of the illustrated structure. An arrow B represents a rearward direction of the illustrated structure. An arrow L represents a leftward direction of the illustrated structure. An arrow R represents a rightward direction of the illustrated structure. The terms "left" and "right" used in the following descriptions represent the left-right directions as viewed from the driver's seat.

Figure 19:
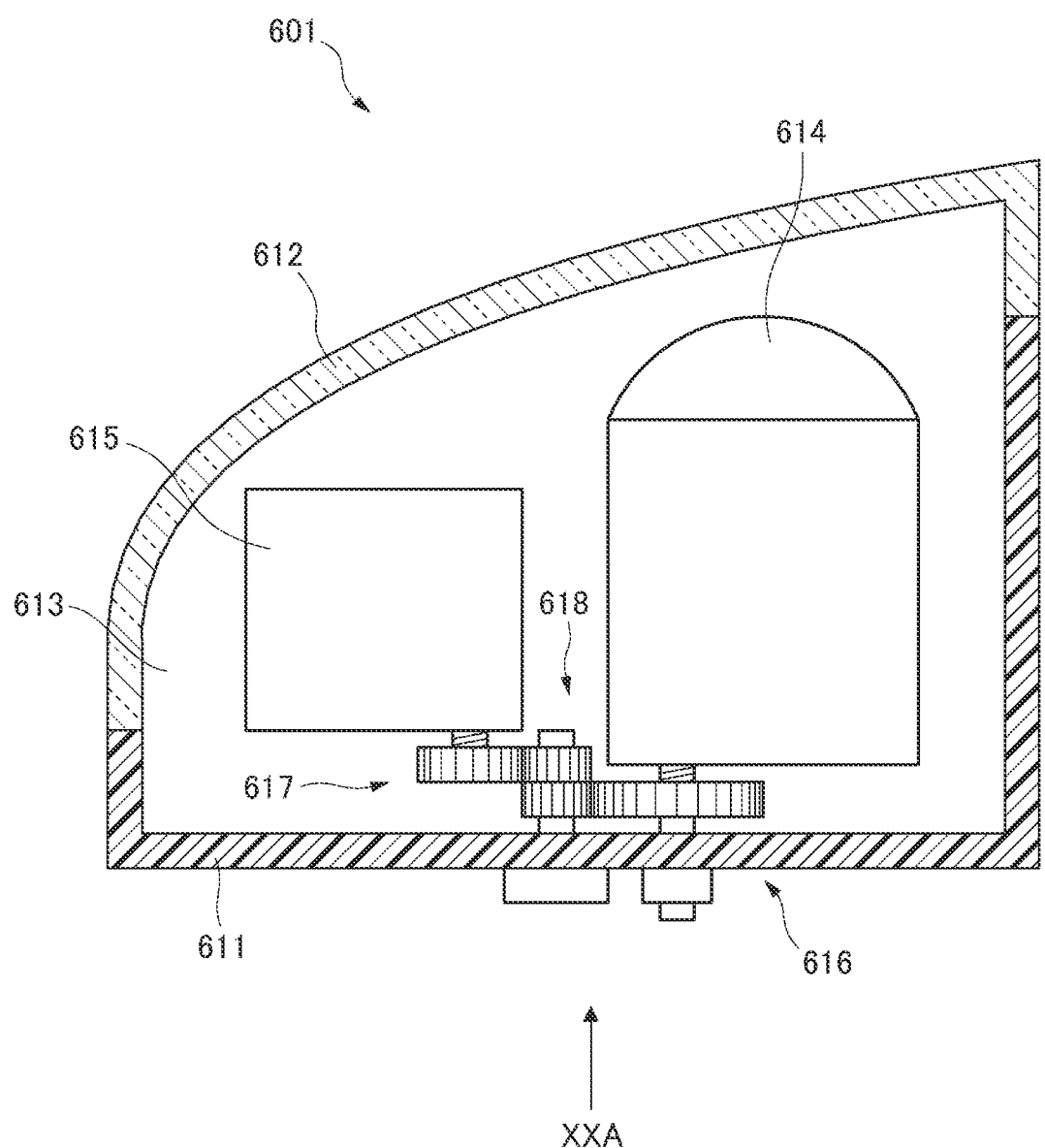
FIG. 19 illustrates a configuration of a lamp device according to the sixth embodiment.

FIG. 19 schematically illustrates a configuration of a left front lamp device 601 according to the sixth embodiment. The left front lamp device 601 includes a housing 611 and a translucent cover 612. The housing 611 defines a lamp chamber 613 together with the translucent cover 612. The left front lamp device 601 is mounted on the left front corner portion LF of the vehicle 100 illustrated in FIG. 2. On the right front corner portion RF of the vehicle 100, right front lamp device having a configuration symmetrical with the left front lamp device 601 relative to the left-right direction is mounted.

As illustrated in FIG. 19, the left front lamp device 601 includes a lamp unit 614. The lamp unit 614 is a device for emitting visible light to the outside of the vehicle 100. The lamp unit 614 is accommodated in the lamp chamber 613. Examples of the lamp unit 614 include a headlamp unit, a clearance lamp unit, a direction indicator lamp unit, and a fog lamp unit.

The left front lamp device 601 includes a sensor unit 615. The sensor unit 615 is accommodated in the lamp chamber 613. The lamp chamber 613 is an example of the space defined by the housing 611. The sensor unit 615 is a device for detecting information in an outside area of the vehicle 100 and outputting a signal corresponding to the information. The sensor unit 615 may be any of a LiDAR sensor unit, a camera unit, and a millimeter wave sensor unit.

The LiDAR sensor unit has a configuration for emitting non-visible light and a configuration for detecting returned light as a result of the non-visible light being reflected by an object existing in at least the outside area of the vehicle. As required, the LiDAR sensor unit may include a scan device that sweeps the non-visible light to change the light emitting direction (i.e., the detecting direction). For example, infrared light having a wavelength of 905 nm is used as the non-visible light.

The camera unit is a device for acquiring an image as information in an outside area of the vehicle. The image may include at least one of a still image and a video image. The camera unit may include a camera sensitive to visible light or a camera sensitive to infrared light.

The millimeter wave sensor unit has a configuration for transmitting a millimeter wave and a configuration for receiving a reflected wave as a result of the millimeter wave being reflected by an object existing in an outside area of the vehicle 100. Examples of frequencies of millimeter waves include 24 GHz, 26 GHz, 76 GHz, and 79 GHz.

The left front lamp device 601 includes a first aiming mechanism 616. The first aiming mechanism 616 is a mechanism for adjusting a lighting reference position of the lamp unit 614.

The left front lamp device 601 includes a second aiming mechanism 617. The second aiming mechanism 617 is a mechanism for adjusting a detecting reference position of the sensor unit 615.

Figure 20A:
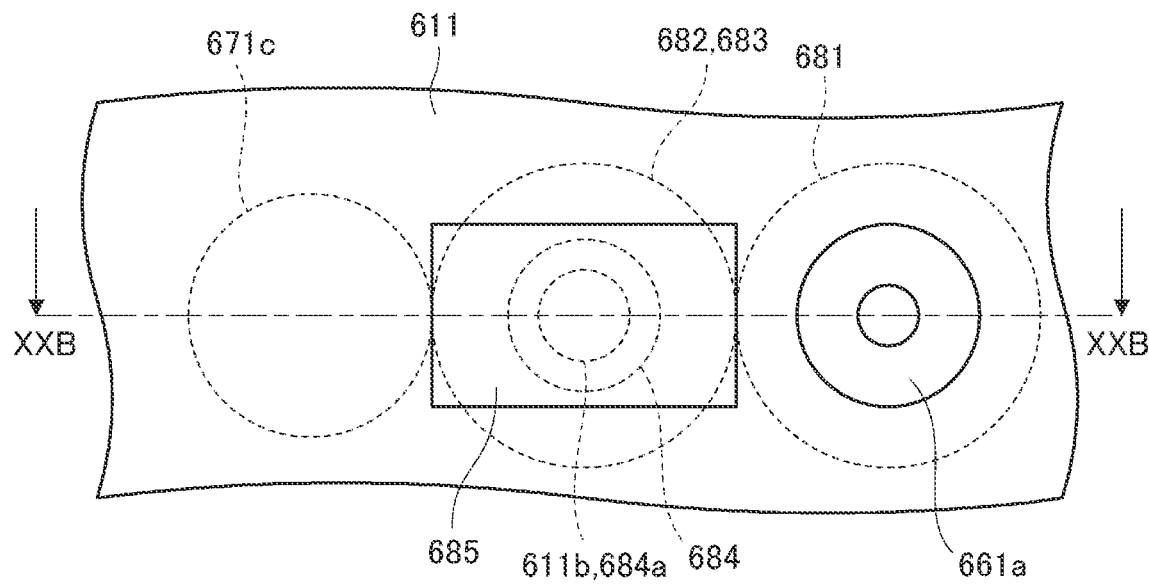
FIGS. 20A and 20B illustrate a first aiming mechanism and a second mechanism in the lamp device of FIG. 19.
Figure 20B:
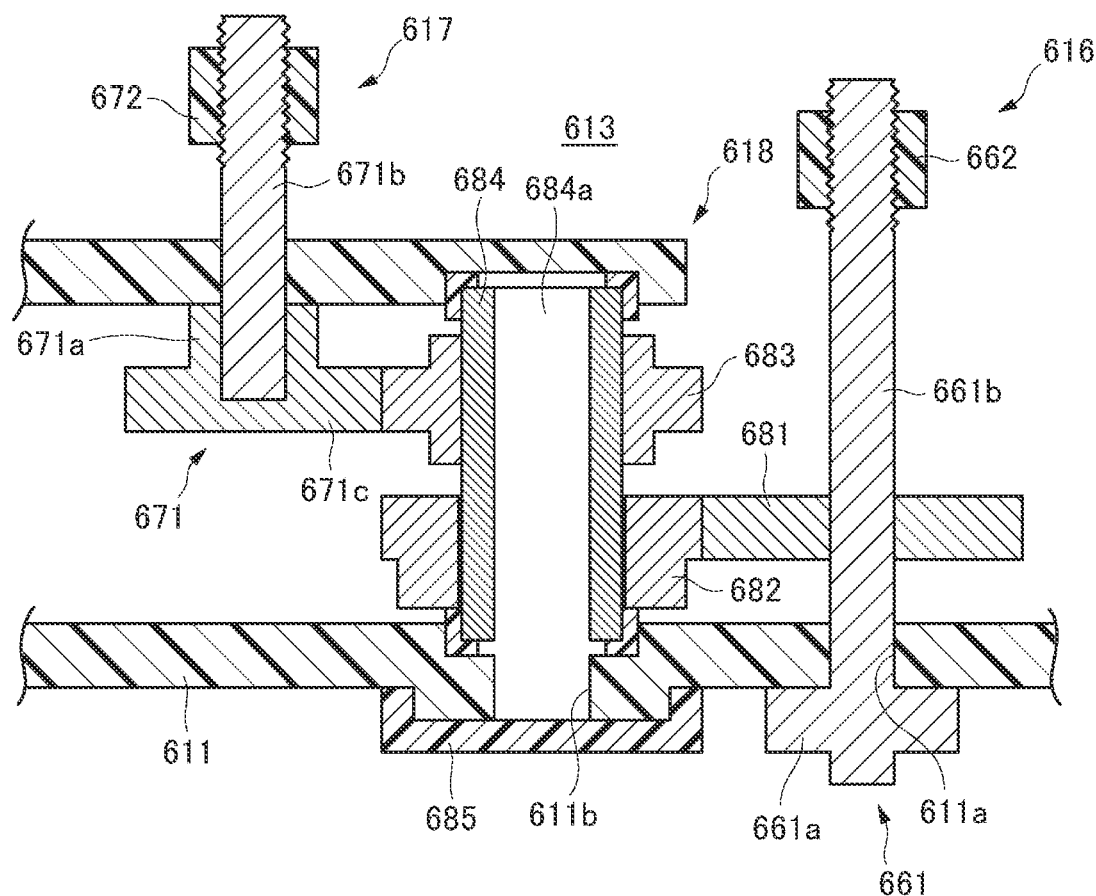

FIG. 20A illustrates an appearance of a portion of the left front lamp device 601 as viewed from the direction of the arrow XXA in FIG. 19. FIG. 20B illustrates a cross section along the line XXB-XXB in FIG. 20A and viewed from the direction of the arrows.

The first aiming mechanism 616 includes an aiming screw 661. The aiming screw 661 has a head portion 661a and a shaft portion 661b. The housing 611 has a through hole 611a. The head portion 661a is disposed outside the housing 611. The shaft portion 661b extends into the lamp chamber 613 through the through hole 611a. A portion of the outer peripheral face of the shaft portion 661b is formed with a screw groove.

The first aiming mechanism 616 includes a link member 662. The link member 662 has a through hole. The inner peripheral face of the through hole is formed with a screw groove. The link member 662 is coupled to the shaft portion 661b of the aiming screw 661 so that the screw grooves are engaged with each other. On the other hand, the link member 662 is coupled to a portion of the lamp unit 614.

Since the head portion 661a is disposed outside the housing 611, the first aiming mechanism 616 can be operated from the outside of the housing 611. When the head portion 661a is rotated by a prescribed tool, the shaft portion 661b also rotates in the same direction. Thus, the link member 662 which is screwed is displaced along the shaft portion 661b. As the posture of the lamp unit 614 changes in response to the displacement, the lighting reference position of the lamp unit 614 is changed. Since the manner of adjusting the lighting reference position of the lamp unit 614 with the link member 662 itself is well known, detailed descriptions thereof will be omitted.

The second aiming mechanism 617 includes an aiming screw 671. The aiming screw 671 has a head portion 671a and a shaft portion 671b. The head portion 671a is disposed in the lamp chamber 613. The outer peripheral face of the shaft portion 661b is formed with a screw groove.

The second aiming mechanism 617 includes a link member 672. The link member 672 has a through hole. The inner peripheral face of the through hole is formed with a screw groove. The link member 672 is coupled to the shaft portion 671b of the aiming screw 671 so that the screw grooves are engaged with each other. On the other hand, the link member 672 is coupled to a portion of the sensor unit 615.

Since the head portion 671a is disposed in the lamp chamber 613, the second aiming mechanism 617 cannot be operated from the outside of the housing 611. Accordingly, the left front lamp device 601 includes a switching device 618. The switching device 618 is a device capable of switching between a first state allowing operation of only the first aiming mechanism 616 from the outside of the housing 611 and a second state in which the second aiming mechanism 617 is operated in response to operation of the first aiming mechanism 616.

The switching device 618 includes a first gear 681. The first gear 681 is coupled to the shaft portion 661b of the aiming screw 661 in the first aiming mechanism 616. Namely, when the head portion 661a of the aiming screw 661 is rotated outside the housing 611, the first gear 681 is also rotated in the same direction.

The switching device 618 includes a second gear 682, a third gear 683, and a shaft 684. The shaft 684 is rotatably supported by a bearing mechanism. The second gear 682 meshes with the first gear 681. The second gear 682 is capable of idling around the shaft 684 at a normal state. The third gear 683 is coupled to the shaft 684. Thus, the third gear 683 rotates in the same direction as the shaft 684.

A gear 671c is formed on the outer peripheral face of the head portion 671a of the aiming screw 671 in the second aiming mechanism 617. The gear 671c meshes with the third gear 683.

The state illustrated in FIG. 20B corresponds to the first state described above. When the head portion 661a of the aiming screw 661 is rotated outside the housing 611, the first gear 681 is also rotated in the same direction. Its rotation is transmitted to the second gear 682. However, since the second gear 682 idles around the shaft 684, the third gear 683 does not rotate. Accordingly, the operation of only the first aiming mechanism 616 is allowed.

The shaft 684 has a hollow portion 684a. The housing 611 is formed with a through hole 611b. The through hole 611b communicates with the hollow portion 684a. Normally, the through hole 611b is covered with a cover 685.

Figure 21A:
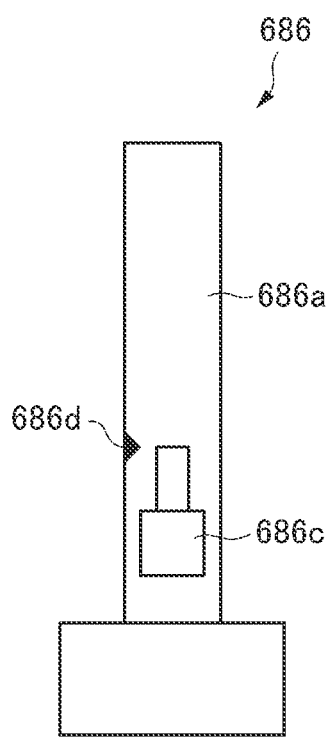
FIGS. 21A to 21C illustrate configurations of a switching device adapted to be used in the lamp device of FIG. 19.
Figure 21B:
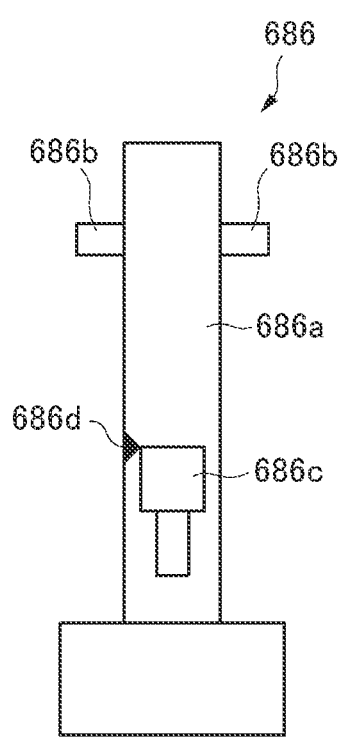

As illustrated in FIG. 21A, the switching device 618 includes a key member 686. The key member 686 has a cylindrical shaft portion 686a. As illustrated in FIG. 21B, the key member 686 includes a pair of protrusions 686b. Each protrusion 686b protrudes from a side face of the shaft portion 686a. Each of the protrusions 686b is urged toward the outside of the shaft portion 686a by an elastic member (not illustrated).

The key member 686 includes an operation member 686c. When the operating member 686c is moved to the position illustrated in FIG. 21A, each protrusion 686b is forced back into the shaft portion 686a against the urging force of the elastic member and is received within the shaft portion 686a. When the hand is released from the operation member 686c, each protrusion 686b protrudes outward from the shaft portion 686a by the urging force of the elastic member.

FIG. 21B illustrates a state in which the protruding amount of each protrusion 686b is maximum. In this state, each protrusion 686b can be displaced toward the shaft portion 686a by a force in a direction against the urging force of the elastic member. The position of the operating member 686c is displaced between the position illustrated in FIG. 21A and the position illustrated in FIG. 21B according to the protruding amount of each protrusion 686b. A mark 686d indicates that the operation member 686c is positioned at a position where the protruding amount of each protrusion 686b is maximum.

Figure 22:
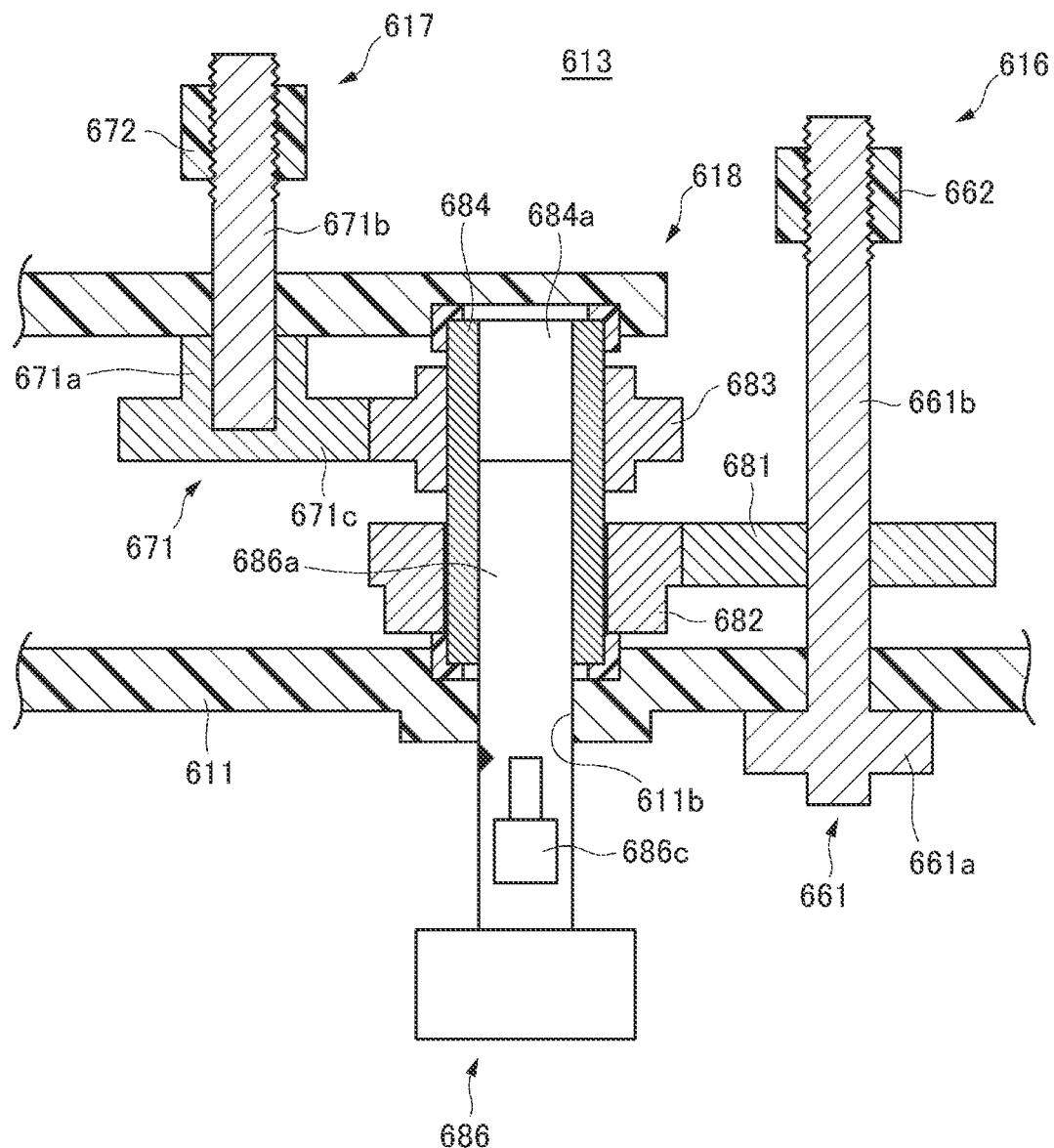
FIG. 22 illustrate how to use the switching device of FIG. 21.

How to use the key member 686 will be described with reference to FIGS. 22 to 24. First, as illustrated in FIG. 22, the key member 686 is inserted into the through hole 611b exposed by removing the cover 685. At this time, the operation member 686c is moved to the position illustrated in FIG. 21A, so that the key member 686 is inserted in a state in which each protrusion 686b is accommodated in the shaft portion 686a. By releasing the hand from the operating member 686c, each protrusion 686b can protrude from the shaft portion 686a, but is prevented from protruding by the inner wall of the hollow portion 684a.

Figure 23:
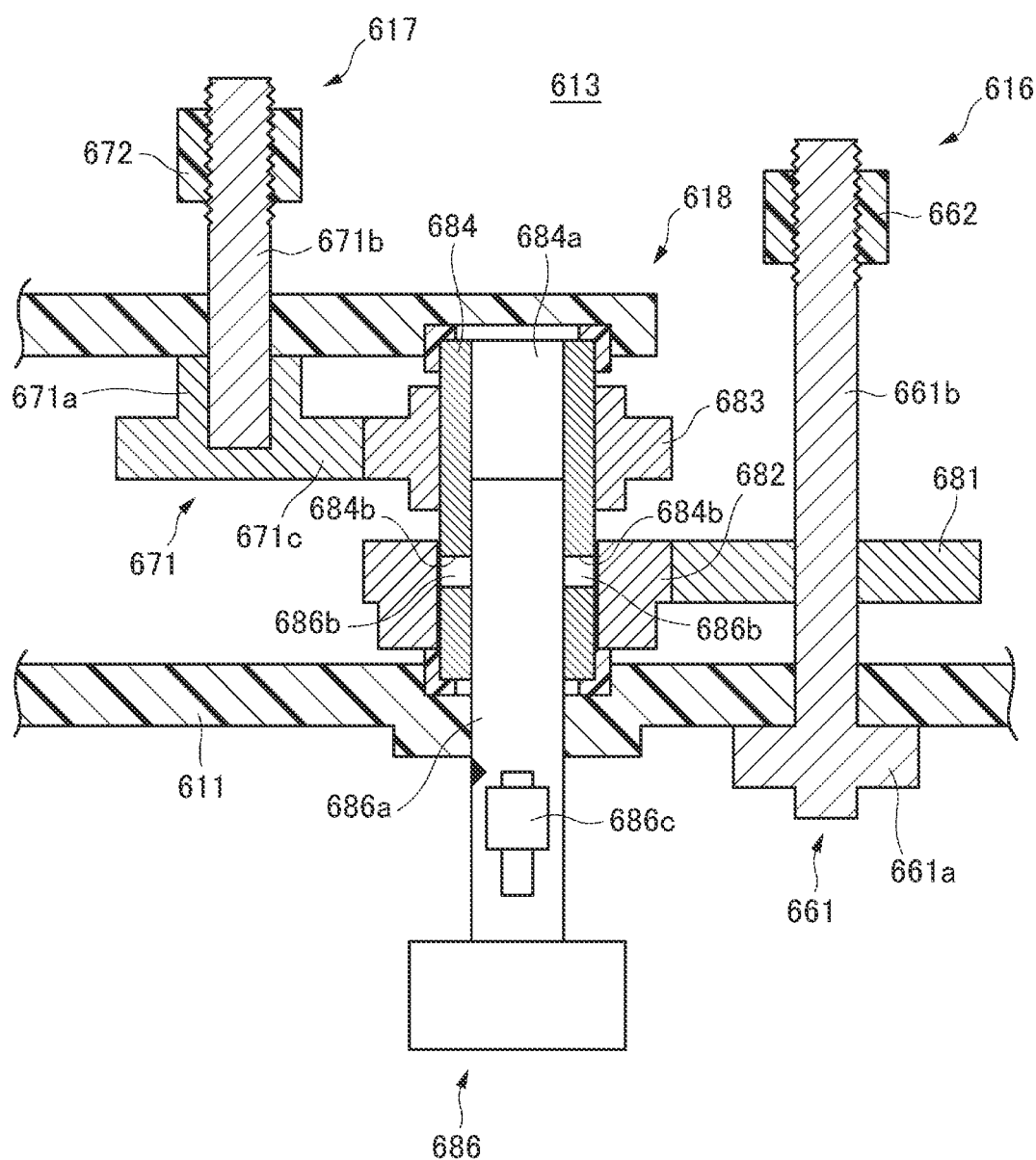
FIG. 23 illustrate how to use the switching device of FIG. 21.

As illustrated in FIG. 23, the shaft 684 has a pair of through holes 684b. Each through hole 684b is formed only partially in the circumferential direction of the shaft 684. Each of the through holes 684b extends in the radial direction of the shaft 684, thereby communicating the hollow portion 684a with the outside of the shaft 684. While the key member 686 is rotated in a state in which the hand is released from the operation member 686c, a state in which the pair of protrusions 686b oppose the pair of through holes 684b is temporarily established. At this time, each of the protrusions 686b protrudes by the urging force of the elastic member and enters an associated one of the through holes 684b.

Figure 24:
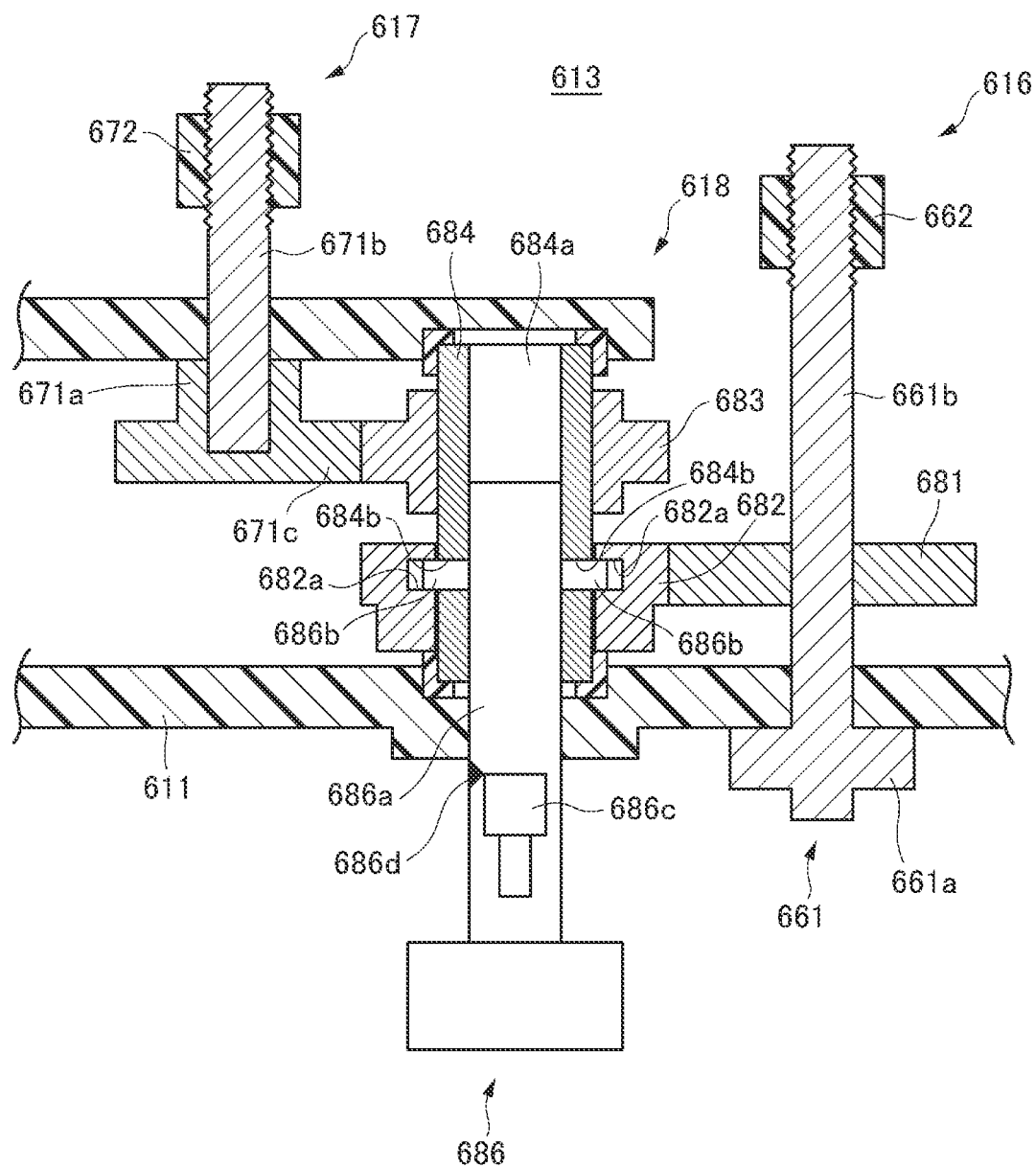
FIG. 24 illustrate how to use the switching device of FIG. 21.

As illustrated in FIG. 24, the inner peripheral face of the second gear 682 is formed with a pair of lateral holes 682a. Each lateral hole 682a extends in the radial direction of the second gear 682. While the first gear 681 and the second gear 682 are rotated by way of the aiming screw 661, a state in which the pair of lateral holes 682a oppose the pair of through holes 684b is temporarily established. At this time, each of the protrusions 686b further protrude by the urging force of the elastic member and enter an associated one of the lateral holes 682a. Accordingly, the second gear 682 and the shaft 684 are coupled by way of the pair of protrusions 686b.

The state illustrated in FIG. 24 corresponds to the second state described above. When the head portion 661a of the aiming screw 661 is rotated outside the housing 611, the first gear 681 is also rotated in the same direction. Its rotation is transmitted to the second gear 682. Since the second gear 682 and the shaft 684 are coupled by way of the key member 686, the shaft 684 rotates in the same direction as the second gear 682. Since the third gear 683 is coupled to the shaft 684, the third gear 683 also rotates in the same direction as the second gear 682. The rotation of the third gear 683 is transmitted to the aiming screw 671 by way of the gear 671c. Thus, the aiming screw 671 rotates in the same direction as the aiming screw 661. That is, the second aiming mechanism 617 is operated in response to the operation of the first aiming mechanism 616.

Thus, the link member 672 which is screwed is displaced along the shaft portion 671b. As the posture of the sensor unit 615 changes in response to the displacement, the detecting reference position of the sensor unit 615 is changed. Since the manner of adjusting the lighting reference position of the sensor unit 615 by way of the link member 672 itself is well known, detailed descriptions thereof will be omitted.

Since the protruding amount of each protrusion 686b is maximum in the state illustrated in FIG. 24, the operation member 686c reaches the mark 686d. Namely, the user can recognize that the second state has been established based on the fact that the operation member 686c has reached the mark 686d.

After the adjustment of the detecting reference position of the sensor unit 615 is completed, the operating member 686c of the key member 686 is moved to the position illustrated in FIG. 22, whereby the pair of protrusions 686b is pulled back to the shaft portion 686a, so that the coupling between the second gear 682 and the shaft 684 is canceled. In other words, the second state is switched to the first state. In this state, or after the key member 686 is removed from the hollow portion 684a, the lighting reference position of the lamp unit 614 can be adjusted by operating the first aiming mechanism 616.

According to the configuration as described above, unless the switching device 618 establishes the second state, it is impossible to operate the second aiming mechanism 617 accommodated in the housing 611. Accordingly, it is possible to restrain the general users from performing the adjustment of the detecting reference position of the sensor unit 615 provided in the left front lamp device 601.

In the present embodiment, the key member 686 which is a part of the switching device 618 is detachable from the outside of the housing 611. In a state where the key member 686 is detached, only the first state can be established.

According to such a configuration, by managing the key unit 686 so as not to be available to the general user, it is possible to restrain the general users from performing the adjustment of the detecting reference position of the sensor unit 615.

Figure 21C:
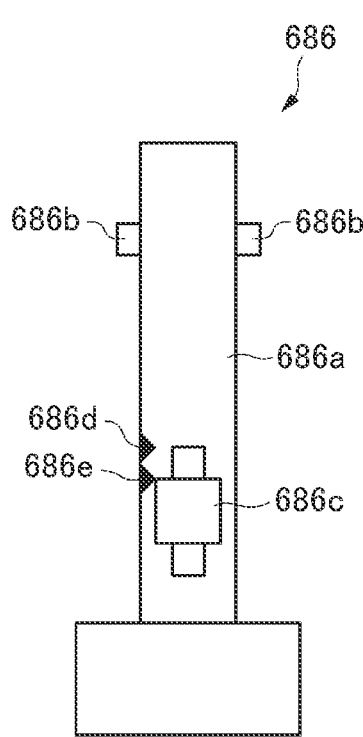
Figure 25:
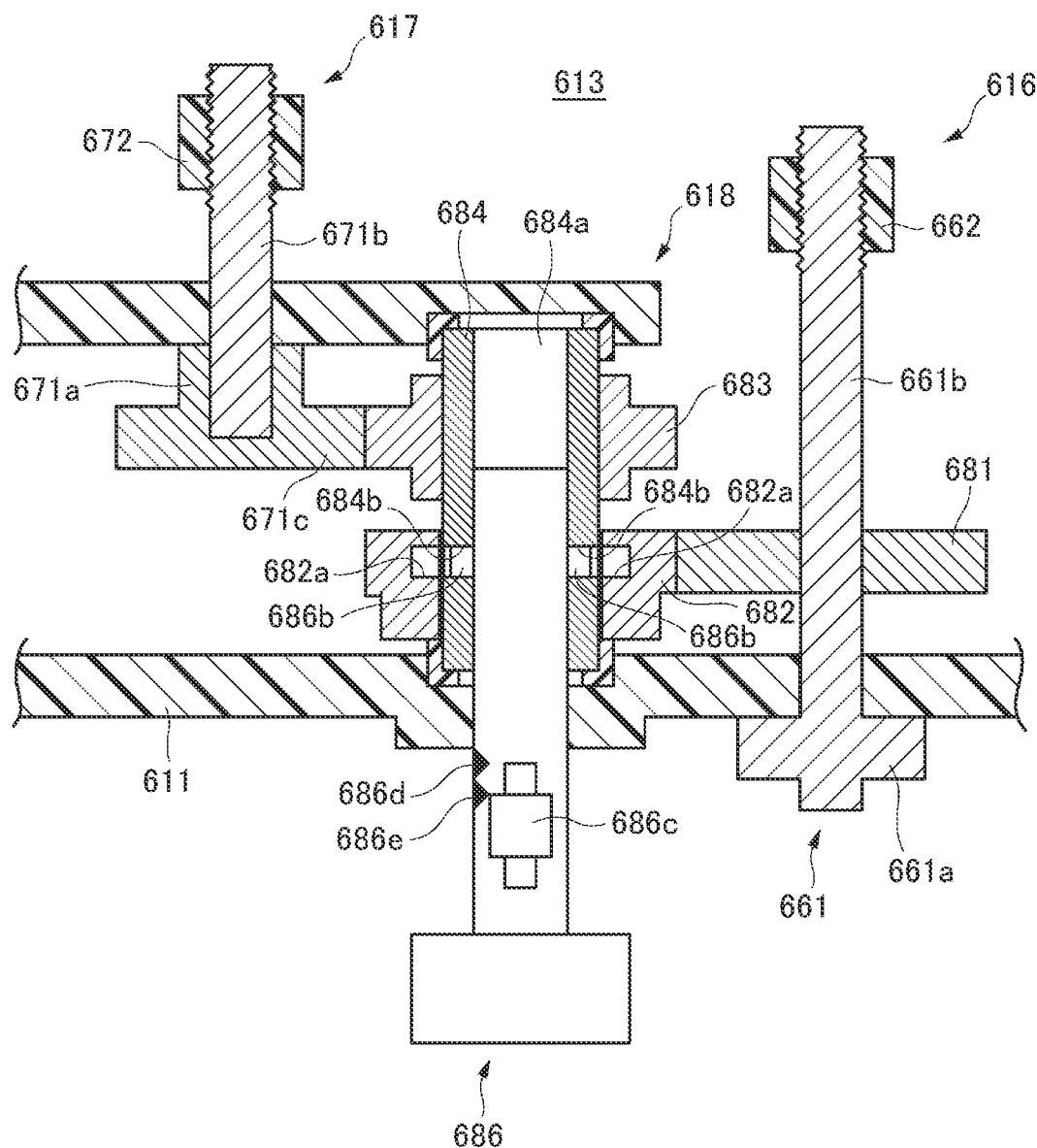
FIG. 25 illustrates an alternative configuration of the switching device of FIG. 21.

As illustrated in FIG. 21C, the operating member 686c of the key member 686 may be lockable in the position indicated by a mark 686e. The position can be set such that the protruding amount of each protrusion 686b is smaller than the state illustrated in FIG. 21B. As illustrated in FIG. 25, the protruding amount is defined as an amount by which the pair of protrusions 686b can engage with only the pair of through holes 684b in the shaft 684.

In this case, the switching device 618 may be in a third state only allowing operation of the second aiming mechanism 617. Namely, by rotating the key member 686 in the state illustrated in FIG. 25, the shaft 684 rotates independently of the second gear 682. Accordingly, the rotation of the shaft 684 is transmitted to the aiming screw 671 by way of the third gear 683 and the gear 671c, and is not transmitted to the aiming screw 661 of the first aiming mechanism 616.

According to such a configuration, since the lighting reference position of the lamp unit 614 and the detecting reference position of the sensor unit 615 can be adjusted independently, the work efficiency is improved.

The sixth embodiment is a mere example for facilitating understanding of the gist of the presently disclosed subject matter. The configuration according to the sixth embodiment can be appropriately modified without departing from the gist of the presently disclosed subject matter.

Figure 26:
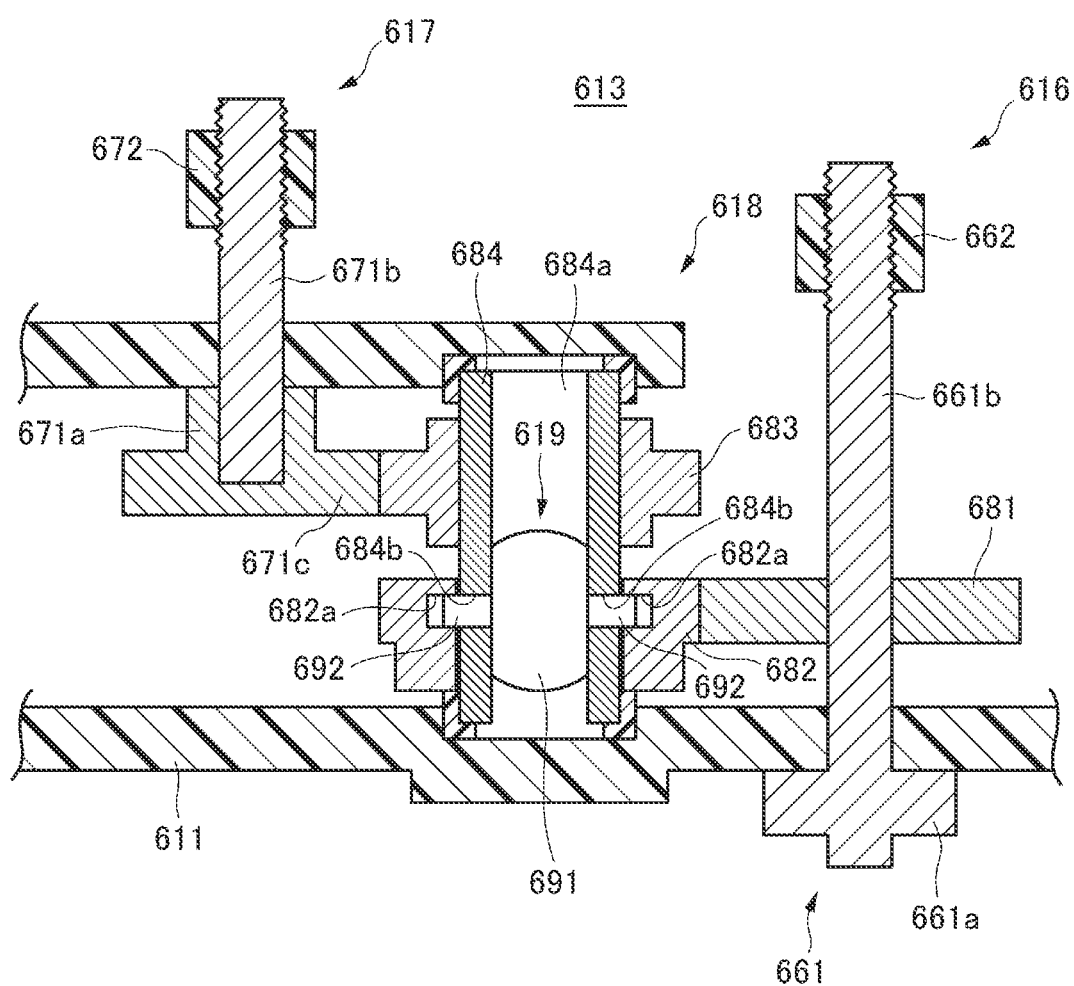
FIG. 26 illustrates an alternative configuration of the switching device of FIG. 21.

In the sixth embodiment, the key member 686 which is a part of the switching device 618 is detachable from the outside of the housing 611. However, as illustrated in FIG. 26, at least a portion of a switching device 619 having a similar switching function to the key member 686 may be disposed in the lamp chamber 613.

The switching device 619 includes a main body 691. The main body 691 is disposed within the hollow portion 684a of the shaft 684. A pair of protrusions 692 can protrude from the main body 691. The relationship between the main body 691 and the pair of protrusions 692 is the same as the relationship between the shaft portion 686a and the pair of protrusions 686b in the above embodiment. Detailed descriptions thereof will be thus omitted. It is possible to selectively take the first state, the second state, and the third state described above in accordance with the protruding amount of each protrusion 692.

The protruding amount of the protrusion 692 may be adjusted by an operation member (not illustrated) coupled to the main body 691 (e.g., a lever, a button, a dial, etc.). The operating member is disposed at a location where the general users cannot access when the left front lamp device 601 is mounted on the vehicle 100.

Even with such a configuration, it is possible to restrain the general users from performing the adjustment of the detecting reference position of the sensor unit 615 provided in the left front lamp device 601. In addition, since there is no need to be aware of the location of the detachable member, it is possible to facilitate management of the switching device 619.

The key member 686 need not to include the operation member 686c. By applying a force of a prescribed value or more in the direction in which the key member 686 is pulled out from the hollow portion 684a of the shaft 684, the pair of protrusions 686b may be pulled back into the shaft portion 686a against the urging force of the elastic member.

The configuration of the left front lamp device 601 is also applicable to a left rear lamp device. The left rear lamp device is mounted on the left rear corner portion LB of the vehicle 100 illustrated in FIG. 2. The basic configuration of the left rear lamp device may be symmetrical with the left front lamp device 601 relative to the front-rear direction.

The configuration of the left front lamp device 601 is also applicable to a right rear lamp device. The right rear lamp device is mounted on the right rear corner portion RB of the vehicle 100 illustrated in FIG. 2. The basic configuration of the right and left rear lamp device is symmetrical with the left rear lamp device described above relative to the left-right direction.

The present application is based on Japanese Patent Application No. 2018-038876 filed on Mar. 5, 2018, Japanese Patent Application No. 2018-049743 filed on Mar. 16, 2018, Japanese Patent Application No. 2018-075300 filed on Apr. 10, 2018, and Japanese Patent Application No. 2018-081311 filed on Apr. 20, 2018, the entire contents of which are incorporated herein by reference.

The invention claimed is:

1. A sensor module adapted to be mounted on a vehicle, comprising:
a housing defining an accommodation chamber and formed with an opening;
a support configured to be attached to and detached from the housing from the outside of the housing;
a first sensor unit supported by the support; and
a second sensor unit supported by the support,
wherein the first sensor unit and the second sensor unit supported by the support are caused to pass through the opening to be disposed in the accommodation chamber, and
wherein when the support is attached to the housing, the support closes the opening and defines a portion of the accommodation chamber.

2. The sensor module according to claim 1,
wherein the first sensor unit and the second sensor unit are entirely located inside an outer edge of the support when viewed from an attaching direction of the support.

3. The sensor module according to claim 1,
wherein the support and the housing have such shapes that regulate a posture of the support when the support is attached to the housing.

4. The sensor module according to claim 3,
wherein each of the support and the opening is in a shape of a modified rectangle when viewed from an attaching direction of the support, and
wherein one of four corners of the modified rectangle has a shape different from other three corners of the four corners.

5. The sensor module according to claim 3,
wherein one of the support and the opening is in a circular shape when viewed from an attaching direction of the support and formed with a protrusion, and
wherein the other one of the support and the opening is in a circular shape when viewed from the attaching direction of the support and formed with a notch for receiving the protrusion.

6. The sensor module according to claim 1,
wherein an attaching direction of the support is along a detecting reference direction of the first sensor unit and a detecting reference direction of the second sensor unit.

7. The sensor module according to claim 1,
wherein a detecting reference position of the first sensor unit is not offset from a detecting reference position of the second sensor unit in a front-rear direction of the vehicle.

8. The sensor module according to claim 1,
wherein a detecting reference position of the first sensor unit is not offset from a detecting reference position of the second sensor unit in an up-down direction of the vehicle.

9. The sensor module according to claim 1,
wherein the first sensor unit and the second sensor unit are so configured to be attached to and detached from the support individually.

10. The sensor module according to claim 1,
wherein a gathering member configured to gather a signal line connected to the first sensor unit and a signal line connected to the second sensor unit is provided with the support.

11. The sensor module according to claim 1,
wherein a control device configured to control at least one of an operation of the first sensor unit and an operation of the second sensor unit is supported by the support.

12. The sensor module according to claim 1,
wherein the support is made of material containing metal.

13. The sensor module according to claim 1, further comprising:
a sealing member configured to be placed between the support and the housing.

14. The sensor module according to claim 1,
wherein at least one of the first sensor unit and the second sensor unit is a camera unit provided with a shading cover surrounding an image pickup face of the camera unit.

15. The sensor module according to claim 1,
wherein a first adjustment mechanism configured to adjust a detecting reference direction of the first sensor unit and a second adjustment mechanism configured to adjust a detecting reference direction of the second sensor unit are supported by the support.

16. The sensor module according to claim 1, further comprising:
a third sensor module supported by the support.

17. A sensor module adapted to be mounted on a vehicle, comprising:
a housing defining an accommodation chamber and formed with an opening;
a support configured to be attached to and detached from the housing from the outside of the housing;
a sensor unit supported by the support; and
a lamp unit supported by the support,
wherein the first sensor unit and the second sensor unit supported by the support are caused to pass through the opening to be disposed in the accommodation chamber, and
wherein when the support is attached to the housing, the support closes the opening and defines a portion of the accommodation chamber.

* * * * *